United States Patent
Hara et al.

(10) Patent No.: US 10,921,522 B2
(45) Date of Patent: Feb. 16, 2021

(54) OPTICAL FIBER MEMBER AND OPTICAL FIBER HOLDER

(71) Applicant: TDK Corporation, Tokyo (JP)

(72) Inventors: Hiroki Hara, Tokyo (JP); Masahiro Shinkai, Tokyo (JP); Takashi Kikukawa, Tokyo (JP); Masami Sasaki, Tokyo (JP); Ryohei Fukuzaki, Tokyo (JP); Motohiro Nakahara, Ibaraki (JP); Tetsuo Miya, Ibaraki (JP); Shuji Tachi, Ibaraki (JP); Koichi Arishima, Ibaraki (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/497,001

(22) PCT Filed: Feb. 20, 2018

(86) PCT No.: PCT/JP2018/005969
§ 371 (c)(1),
(2) Date: Sep. 24, 2019

(87) PCT Pub. No.: WO2018/186037
PCT Pub. Date: Oct. 11, 2018

(65) Prior Publication Data
US 2020/0049888 A1 Feb. 13, 2020

(30) Foreign Application Priority Data

Apr. 4, 2017 (JP) .................................. 2017-074403
Oct. 27, 2017 (JP) .................................. 2017-207820

(51) Int. Cl.
*G02B 6/26* (2006.01)
*G02B 6/42* (2006.01)

(52) U.S. Cl.
CPC ............... *G02B 6/26* (2013.01); *G02B 6/424* (2013.01); *G02B 6/4216* (2013.01)

(58) Field of Classification Search
CPC ... G02B 6/26; G02B 6/30; G02B 6/36; G02B 6/3616; G02B 6/3632; G02B 6/3636;
(Continued)

(56) References Cited

U.S. PATENT DOCUMENTS 10,012,804 B2 * 7/2018 Kuang ................. G02B 6/3829
2004/0165854 A1 8/2004 Niiyama et al.
(Continued)

FOREIGN PATENT DOCUMENTS

| CN | 104570240 | 4/2015 |
|----|-----------|--------|
| JP | 2004-117617 | 4/2004 |

(Continued)

OTHER PUBLICATIONS

International Search Report dated Apr. 17, 2018 in corresponding International PCT Patent Application PCT/JP2018/005969, 2 pages.
Taiwan Office Action dated Jan. 8, 2019 in corresponding Taiwan Patent Application No. 107111613, 14 pages, partial English translation.
(Continued)

*Primary Examiner* — John Bedtelyon
(74) *Attorney, Agent, or Firm* — Ohlandt, Greeley, Ruggiero & Perle, L.L.P.

(57) ABSTRACT

A first disclosure is an optical fiber member equipped with two holding members that hold an optical fiber such that an end surface of the optical fiber is located on one end and a curving portion having a coat of the optical fiber is curved to be extended at another end; the holding members are provided with holding flat portions that sandwich an end portion of the optical fiber where the coat is removed such that the end surface of the optical fiber is located on the one end; at least any of the holding flat portions has an aligning groove to fix a position of the end portion of the optical fiber; the holding member is provided with a curved surface at a
(Continued)

position adjacent to the curving portion in the extending direction D1; and the two holding members are equal in thermal expansion coefficient.

10 Claims, 21 Drawing Sheets

(58) Field of Classification Search
CPC .. G02B 6/3648; G02B 6/3652; G02B 6/3664; G02B 6/3668; G02B 6/3684; G02B 6/42; G02B 6/4201; G02B 6/4202; G02B 6/4216; G02B 6/4219; G02B 6/4236; G02B 6/4239; G02B 6/424; G02B 6/4243; G02B 6/4249; G02B 6/4255; G02B 6/4256; G02B 6/4257; G02B 6/426; G02B 6/4261; G02B 6/4262

See application file for complete search history.

(56) References Cited

U.S. PATENT DOCUMENTS

| | | |
|---|---|---|
| 2011/0123149 A1 | 5/2011 | Hemenway, Jr et al. |
| 2013/0223795 A1 | 8/2013 | Sasaoka et al. |
| 2016/0091677 A1 | 3/2016 | Furuya et al. |

FOREIGN PATENT DOCUMENTS

| | | |
|---|---|---|
| JP | 2011-522288 | 7/2011 |
| JP | 2013-104884 | 5/2013 |
| JP | 2016-71025 | 5/2016 |
| JP | 3205876 | 8/2016 |
| WO | 2017-022026 | 2/2017 |

OTHER PUBLICATIONS

International Preliminary Report on Patentability dated Oct. 17, 2019 in corresponding International PCT Patent Application PCT/JP2018/005969, 11 pages.

* cited by examiner

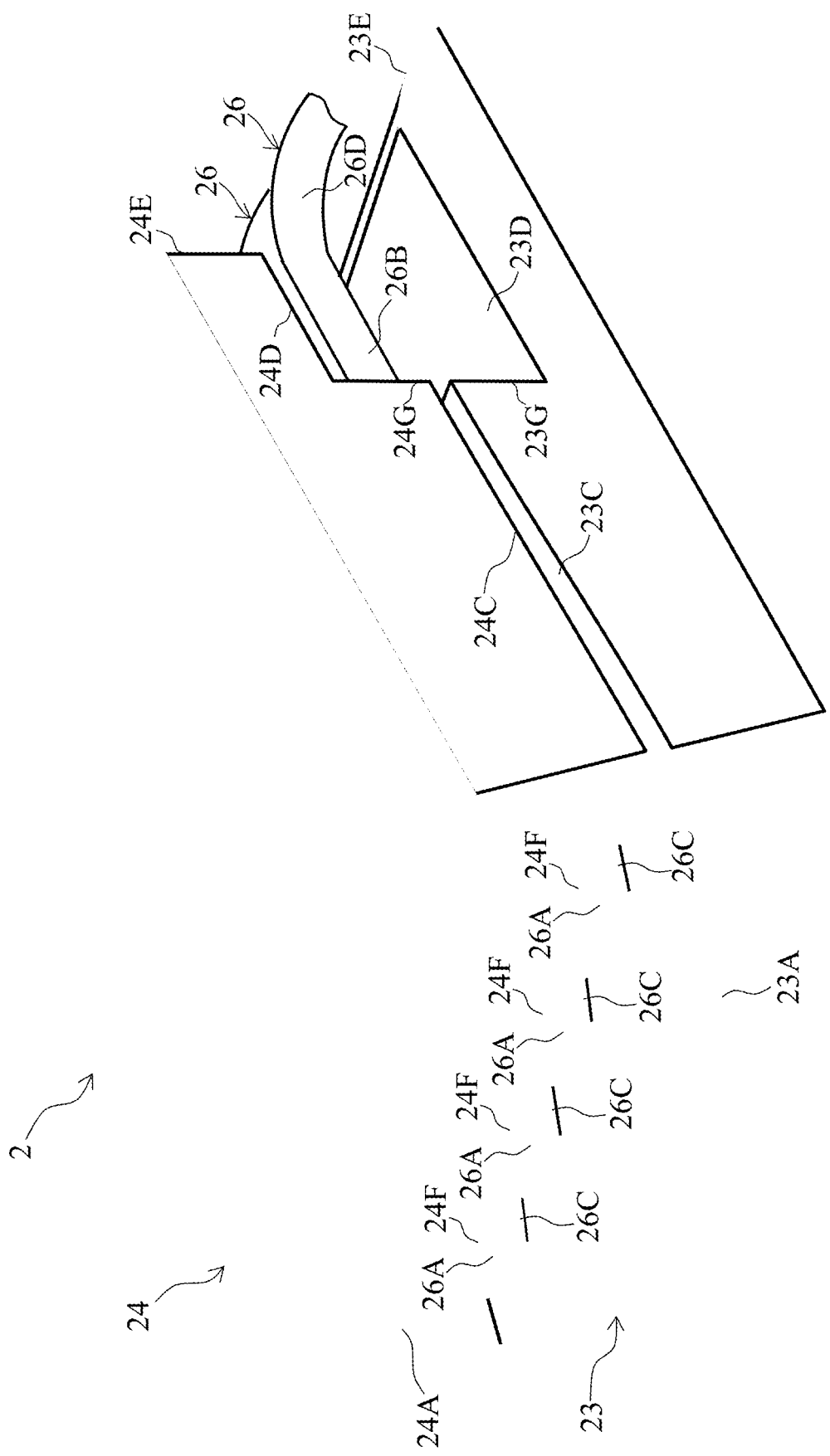

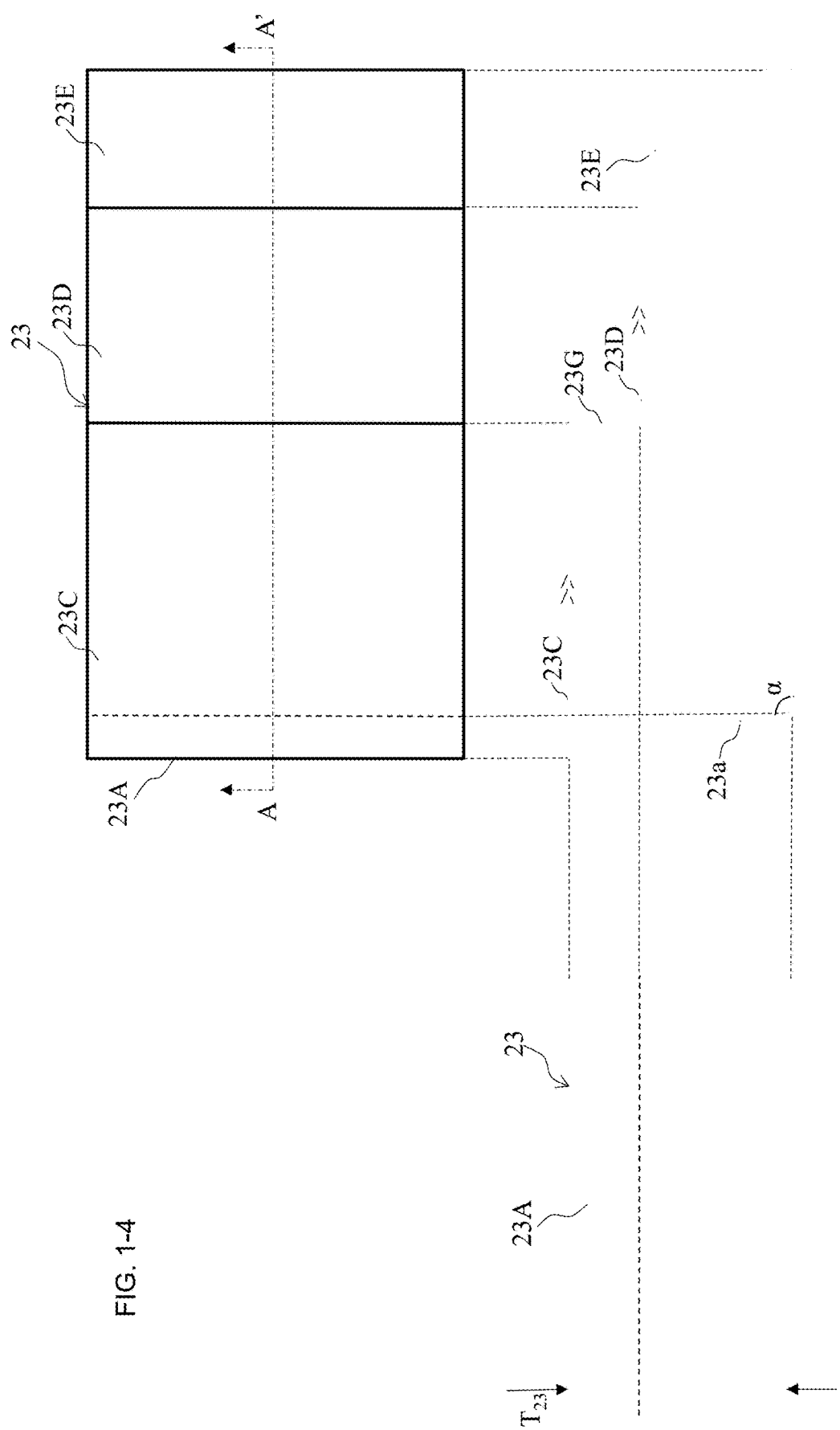

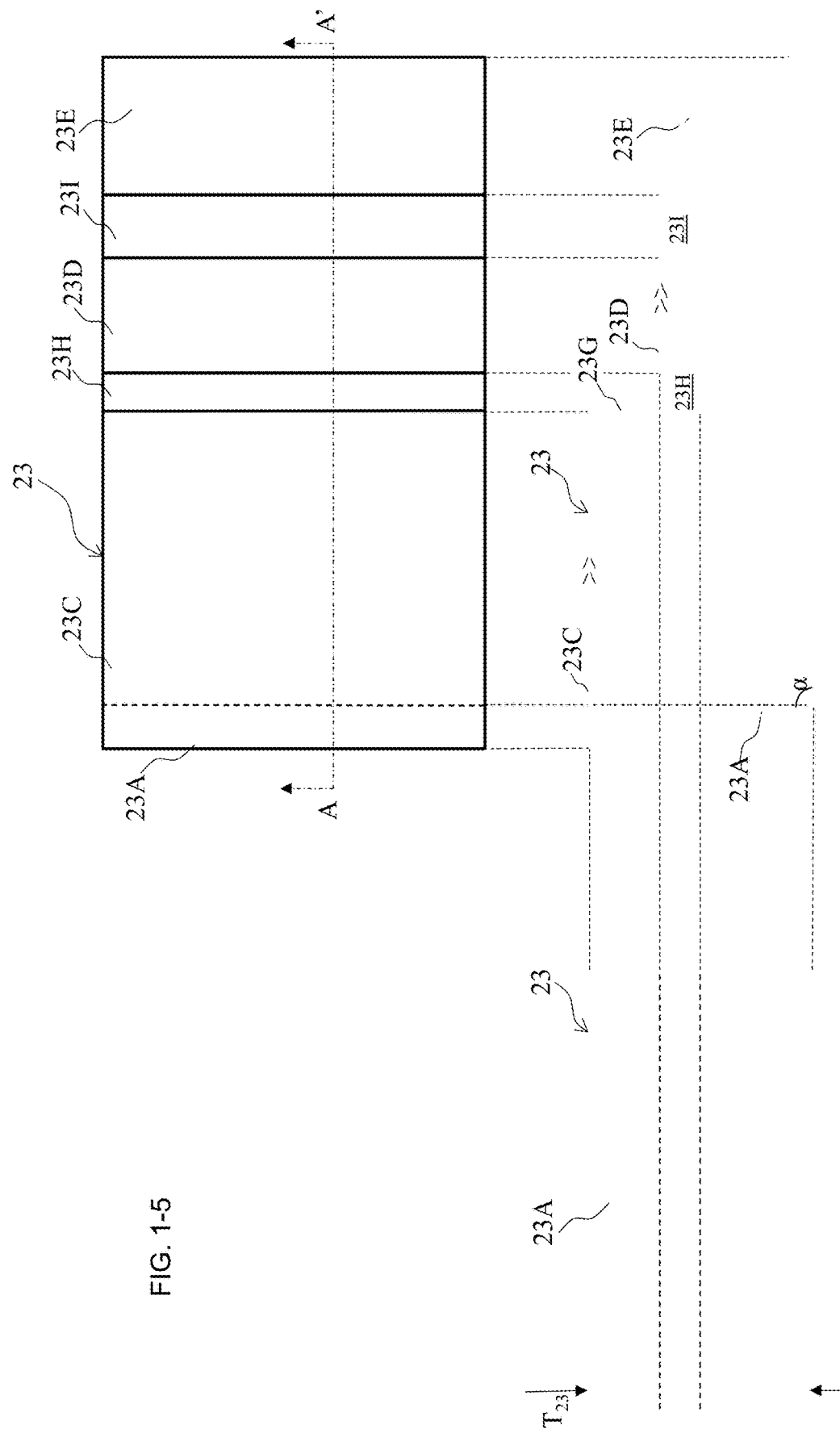

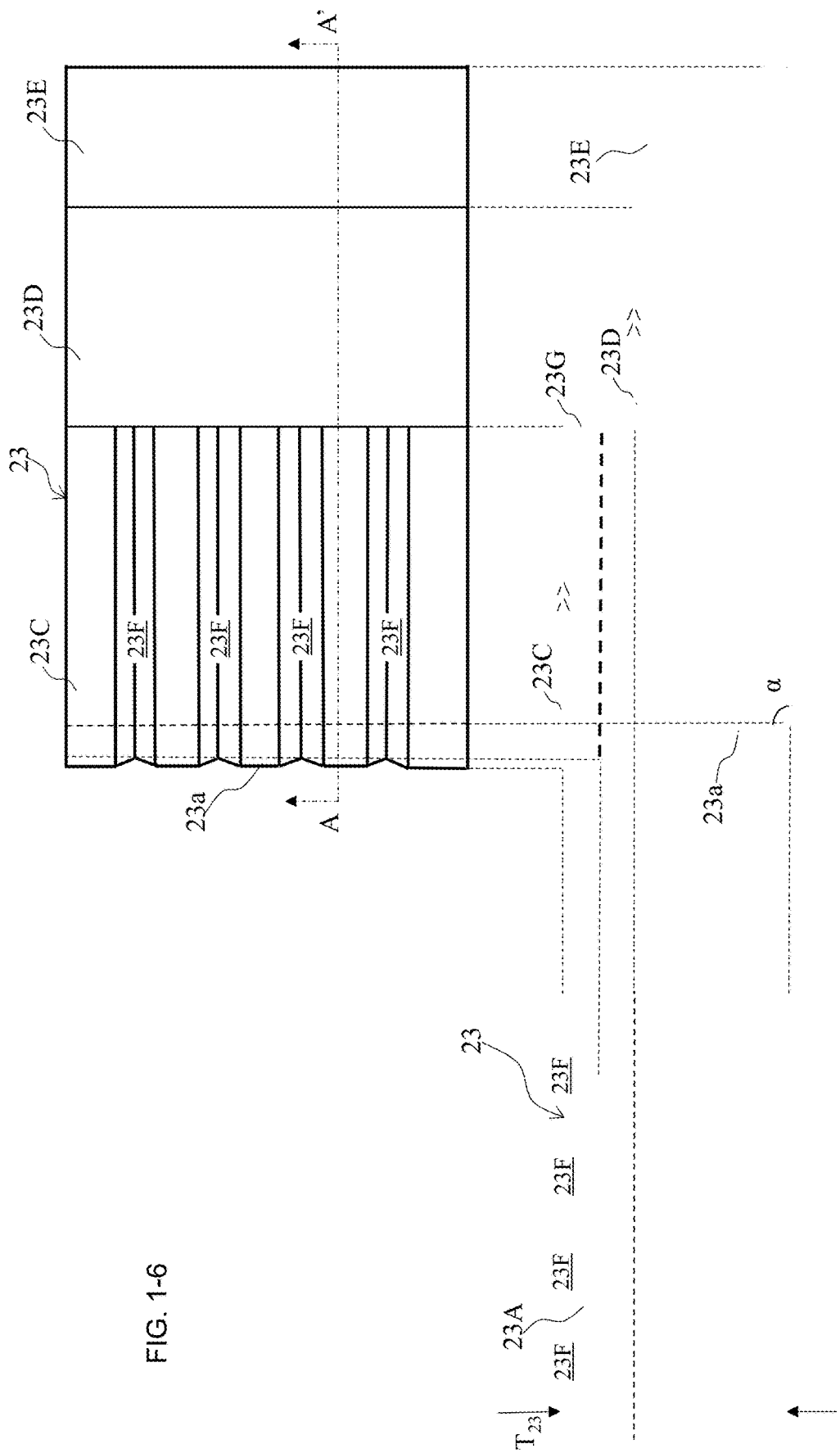

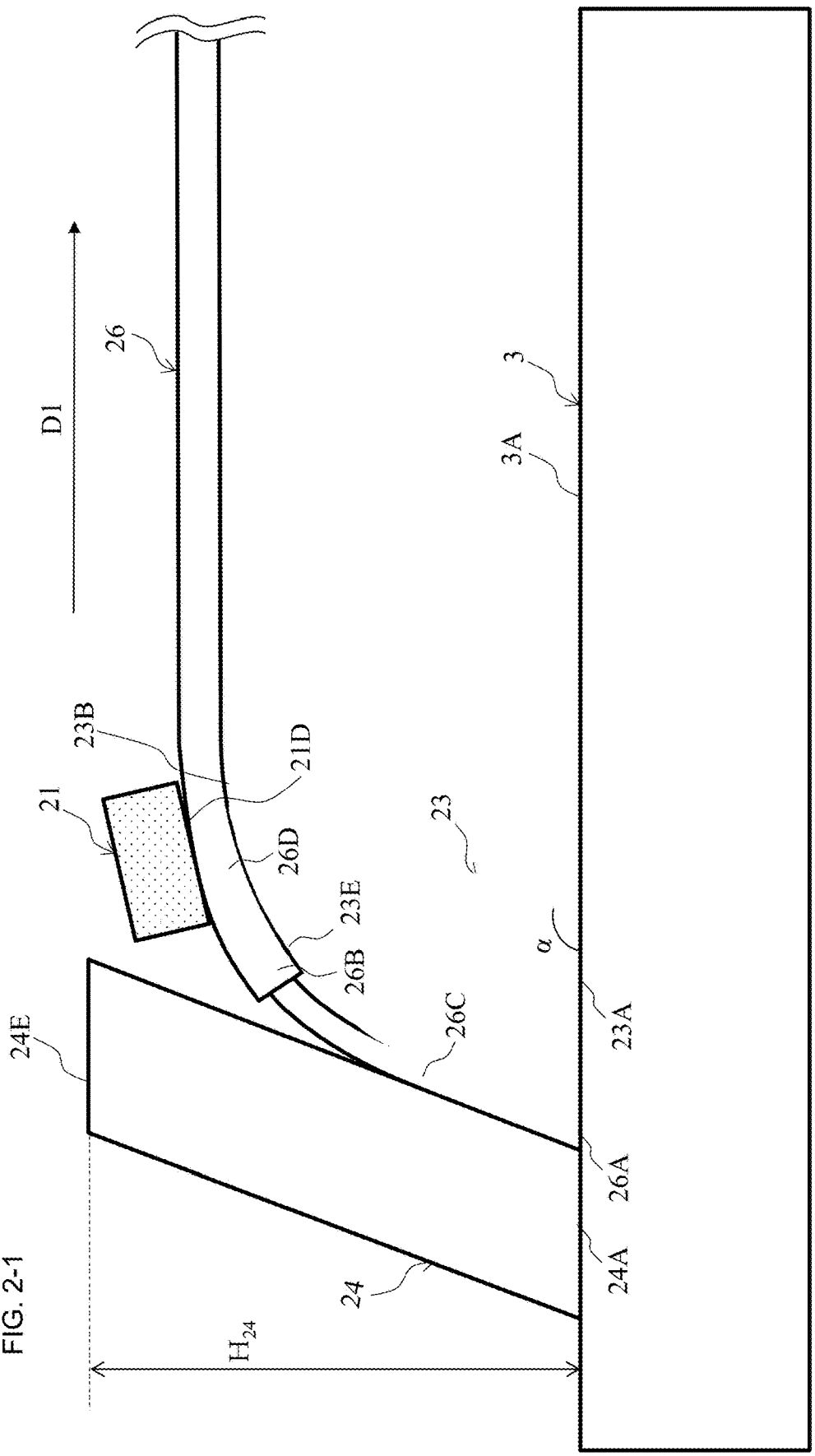

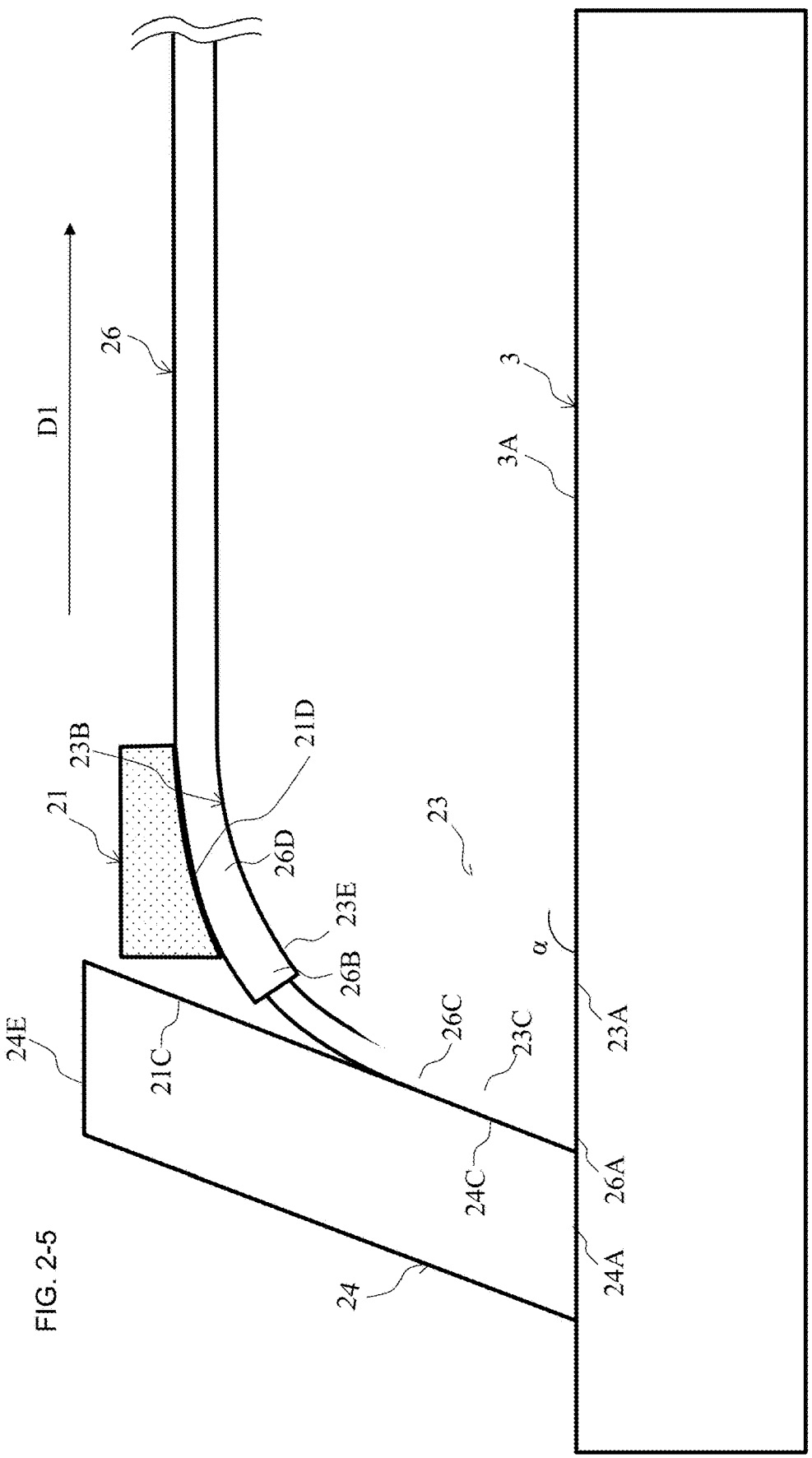

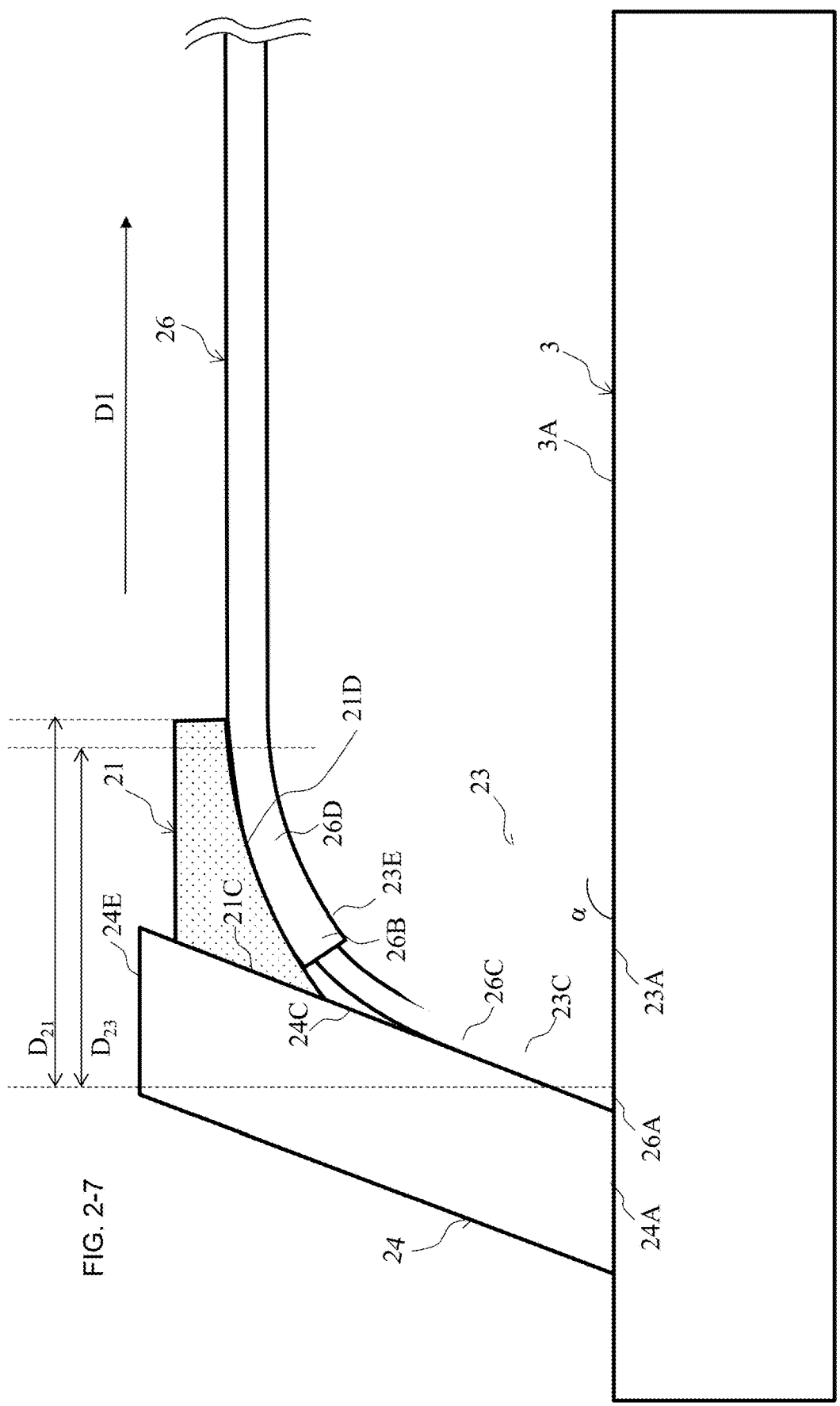

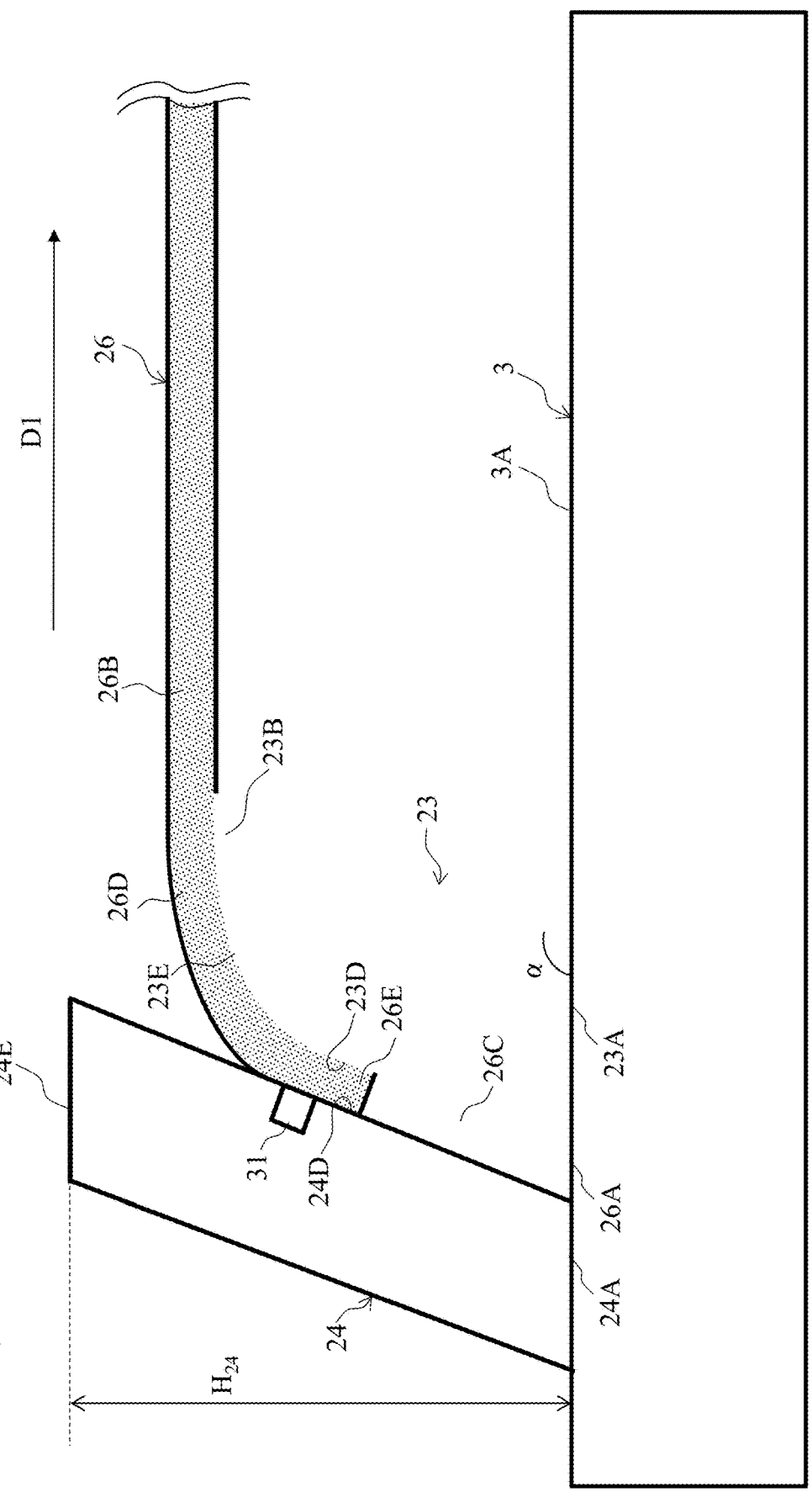

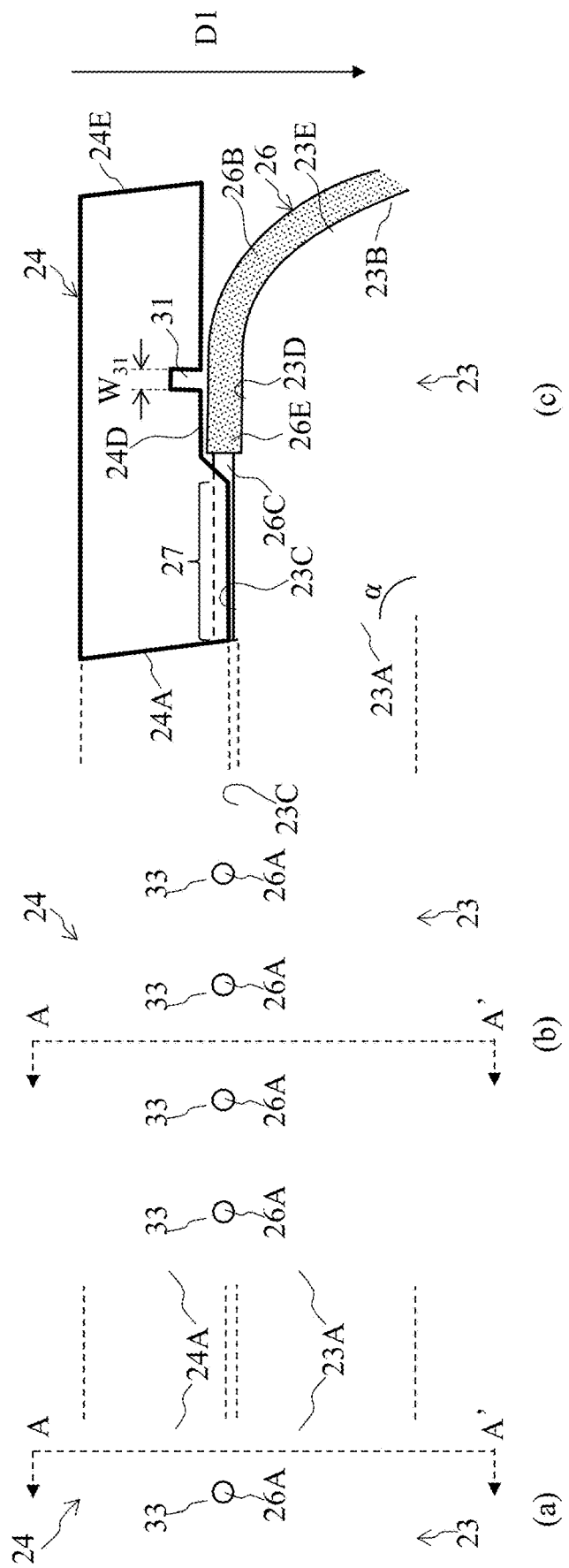

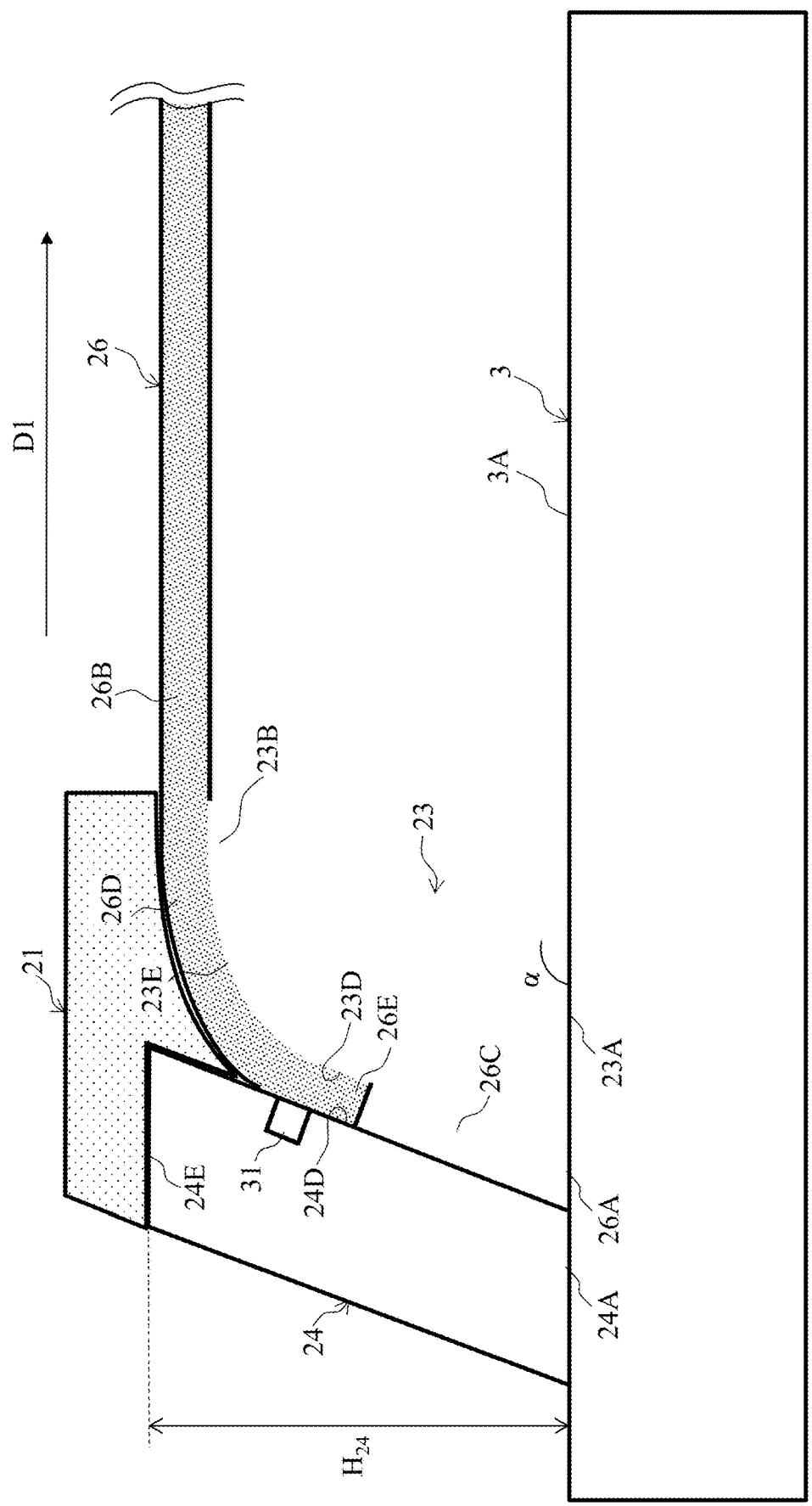

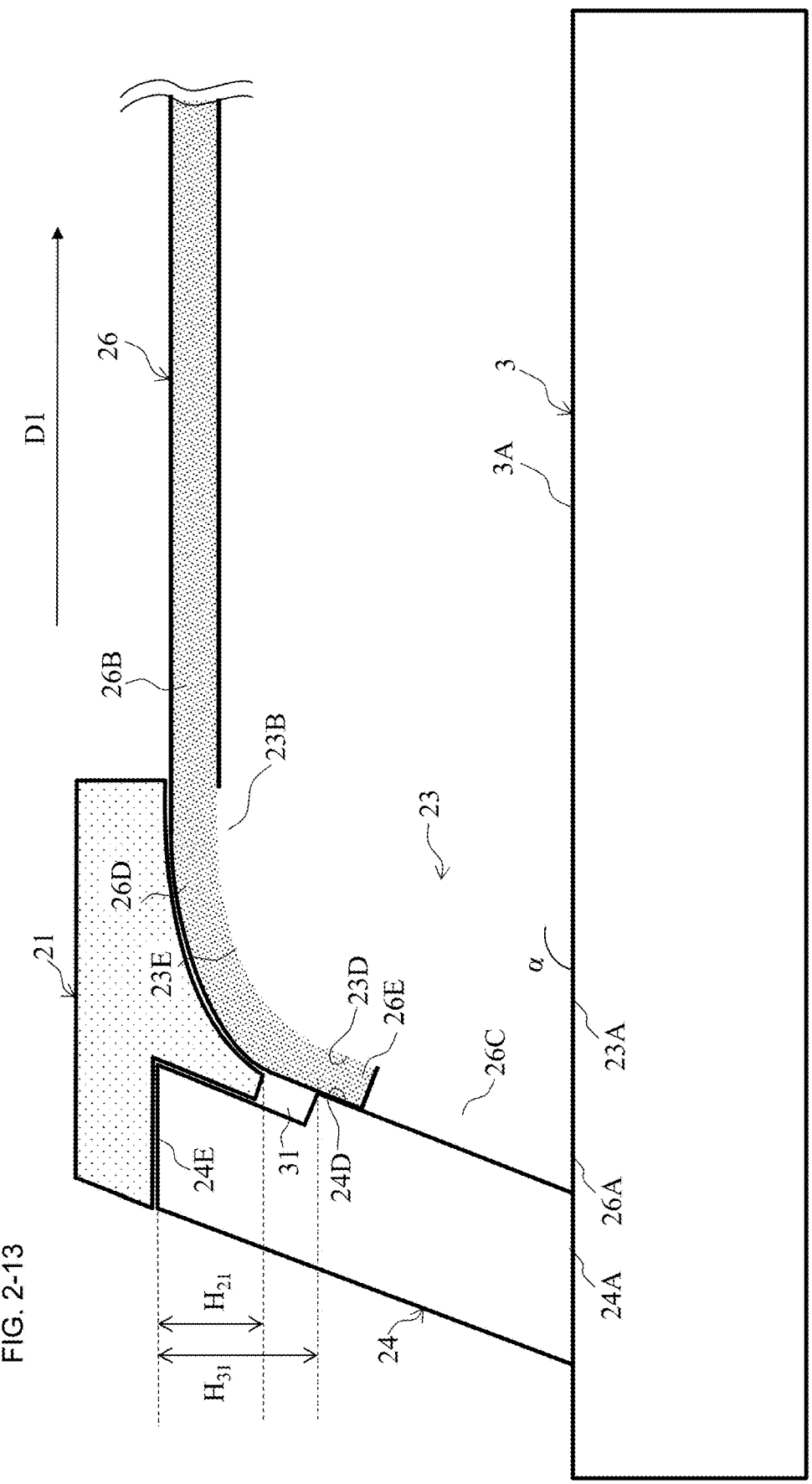

OPTICAL FIBER MEMBER AND OPTICAL FIBER HOLDER

BACKGROUND

1. Field of the Disclosure

The first disclosure relates to an optical fiber member that connects an optical fiber to an optical circuit.

The second disclosure relates to an optical fiber holder that holds an optical fiber.

2. Discussion of the Background Art

Background Art of Second Disclosure

In an optical communication field, Si—P is compact, low cost, and low power consumption compared with a conventional one, and its remarkable service is expected in the Datacom field. This is because a downsized optical waveguide is achievable by the use of Si, and further downsizing is ensured because of optical/electronic circuits allowed to be laminated on an identical board.

One of connecting methods of a silicon waveguide and an optical fiber is a surface coupling (grating coupling). The surface coupling forms a grid shape on a waveguide surface, guides a light ray upward by interference of light, and causes the light ray to enter into the optical fiber connected to the waveguide surface. Alternatively, the light is entered from the optical fiber into the waveguide.

An advantage of the surface coupling is that an ordinary optical fiber can be used for the connection because a spot diameter is approximately 9 µm.

Background Art of First Disclosure

In association with downsizing of optical communication devices, a configuration where an optical fiber connected to an optical circuit is curved to be wired inside a package has been employed. Therefore, there has been proposed a technique to prevent the optical fiber connected to the optical circuit from being curved with equal to or more than a curvature radius that causes deterioration in polarization maintaining characteristic (for example, see Patent Document 1). In Patent Document 1, a support surface is located outside a curving portion of the optical fiber, and a support surface and the optical fiber are secured by an adhesive.

Meanwhile, there has been proposed an optical connector to optically couple an optical circuit board and an optical fiber guided in parallel (for example, see Patent Document 2). In the optical connector of Patent Document 2, to allow distribution as an optical connector, a peripheral area of a curved surface is covered with a holding member.

In Patent Document 1, a member constituting the support surface is required separately from a member to position the optical fiber. In Patent Document 2, a member to cover the peripheral area of the curved surface is required separately from the member to position the optical fiber. Therefore, Patent Documents 1 and 2 have had a problem that a component to curve the optical fiber is additionally needed.

Patent Documents of Second Disclosure

Patent Document 1: JP-A-2016-071025
Patent Document 2: WO2017-022026

Patent Documents of First Disclosure

Patent Document 1: JP-A-2016-71025
Patent Document 2: Japanese Registered Utility Model No. 3205876

Problems to be Solved by Second Disclosure

As a disadvantage of the surface coupling, because of a shape where an optical fiber holder protrudes from the silicon waveguide, a low profile is preferable in consideration of implementing. For ensuring the low profile and downsizing, a bending work on the optical fiber is necessary. The problem described in the method of Patent Document 1 as a solution to this problem has a problem that this method cannot control a bending radius. Patent Document 2 has a problem that a device to rotate a component that holds the optical fiber is required, and an R bended portion of the optical fiber is disposed outside the optical fiber holder to increase the size.

Therefore, it is an object of this disclosure to ensure controlling a bending radius without increasing a size of a component that secures an optical fiber.

Problems to Be Solved by First Disclosure

From the aspect of downsizing the optical communication device, the number of components is preferred to be small. The increase in the number of components possibly causes deterioration in performance and a failure of the optical communication device. Therefore, it is an object of this disclosure to provide an optical fiber member that ensures curving an optical fiber to be connected to an optical circuit with a small number of components.

SUMMARY

To achieve the above-described objects, an optical fiber member of the first disclosure is an optical fiber member that includes two holding members that hold an optical fiber such that an end surface of the optical fiber is located on one end and a predetermined part having a coat of the optical fiber is curved to be extended at another end. The two holding members include holding flat portions that sandwich an end portion of the optical fiber where the coat is removed such that the end surface of the optical fiber is located on the one end of the optical fiber member. At least any of the holding flat portions included in the two holding members has an aligning groove to fix a position of the end portion of the optical fiber. A first holding member among the two holding members positioned in an extending direction of the optical fiber has a curved surface at a position adjacent to the predetermined part in the extending direction. The curved surface is curved with a predetermined curvature radius along the extending direction of the optical fiber.

An optical fiber holder of the second disclosure includes a first holding member where an end portion of an optical fiber is located on one end and the optical fiber is located to be extended on another end, and a second holding member that sandwiches the optical fiber with the first holding member. The first holding member and the second holding member include optical fiber holding portions to sandwich an element wire of the optical fiber on the one ends. The other end of the first holding member includes a curving portion curved with a predetermined curvature radius along an extending direction of the optical fiber. A depressed portion is provided on at least any one of a first planar surface connecting the optical fiber holding portion and the curving portion and included in the first holding member or a second planar surface facing the first planar surface across the optical fiber and included in the second holding member.

The first disclosure can provide an optical fiber member that ensures curving an optical fiber to be connected to an optical circuit with a small number of components.

The second disclosure ensures controlling a bending radius without increasing a size of a component that secures an optical fiber.

BRIEF DESCRIPTION OF THE DRAWINGS (Brief Description of Drawings of First Disclosure)

FIG. 1-2 is a perspective view illustrating an example of a first holding member and a second holding member.

Figure 1:
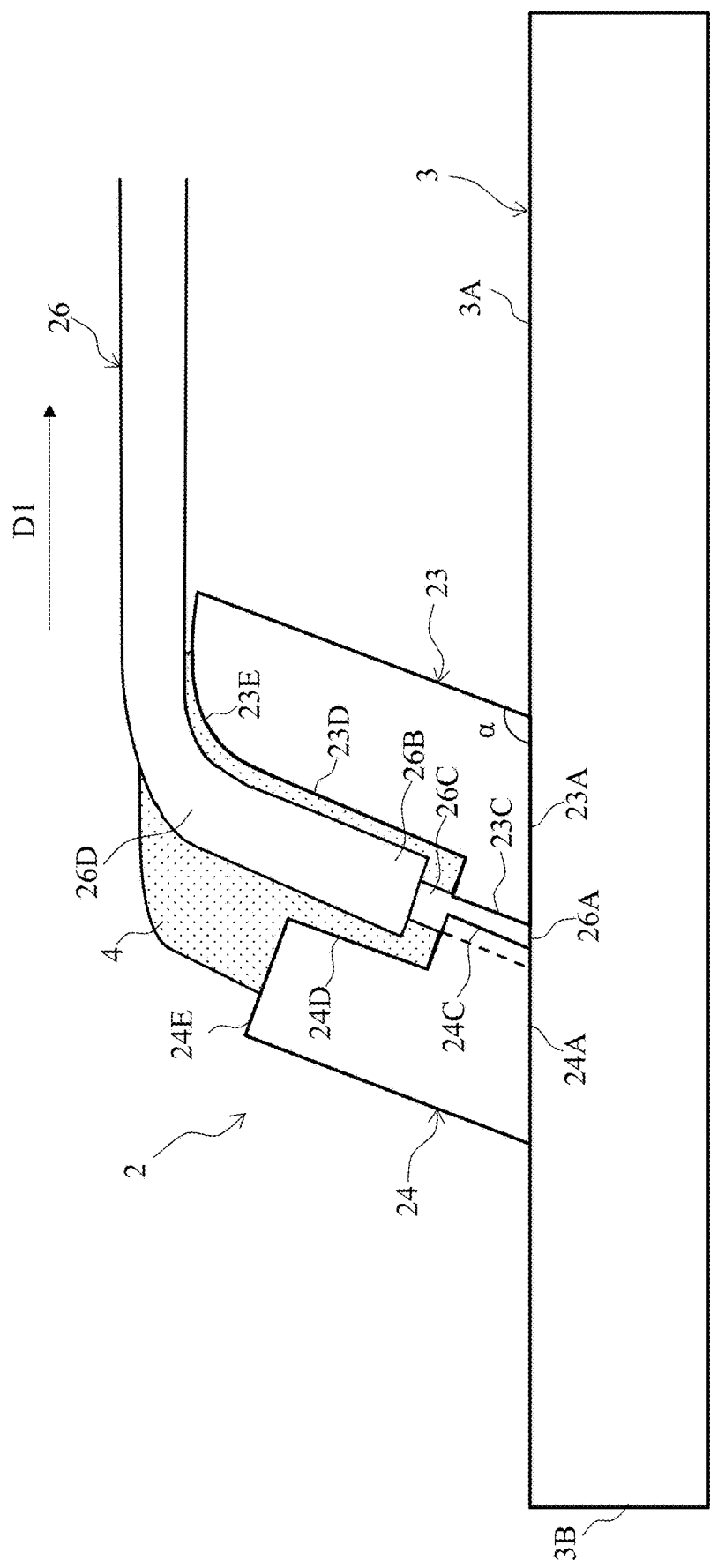
FIG. 1-1 illustrates a first example of connecting an optical fiber member according to a first embodiment of the first disclosure.
Figures 1, 2, 3:
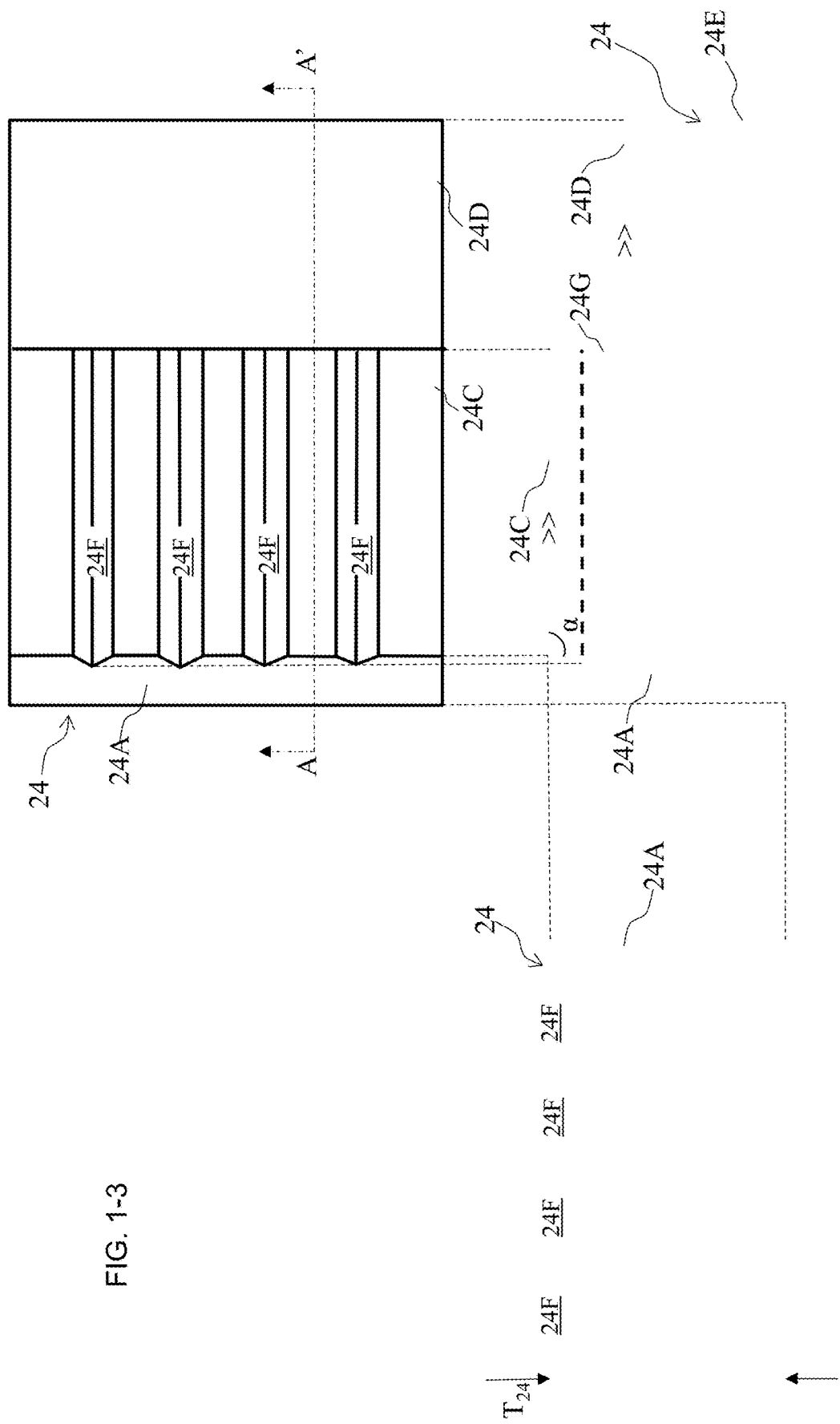

FIG. 1-3 includes a top view, a side view, and a cross-sectional view taken along a line A-A' illustrating the example of the second holding member.

FIG. 1-4 includes a top view, a side view, and a cross-sectional view taken along a line A-A' illustrating a first example of the first holding member.

FIG. 1-5 includes a top view, a side view, and a cross-sectional view taken along a line A-A' illustrating a second example of the first holding member.

FIG. 1-6 includes a top view, a side view, and a cross-sectional view taken along a line A-A' illustrating a third example of the first holding member.

FIG. 1-7 illustrates a second example of connecting the optical fiber member according to the first embodiment of the first disclosure.

FIG. 1-8 illustrates an example of connecting an optical fiber member according to a second embodiment of the first disclosure.

(Brief Description of Drawings of Second Disclosure)

FIG. 2-1 illustrates an example of connecting an optical fiber holder to an optical circuit according to a first embodiment of the second disclosure.

FIG. 2-2 includes side views and a cross-sectional view illustrating an exemplary first configuration of the optical fiber holder according to the first embodiment of the second disclosure.

FIG. 2-3 includes side views and a cross-sectional view illustrating an exemplary second configuration of the optical fiber holder according to the first embodiment of the second disclosure.

Figures 1, 2, 3, 4, 5, 6, 7:
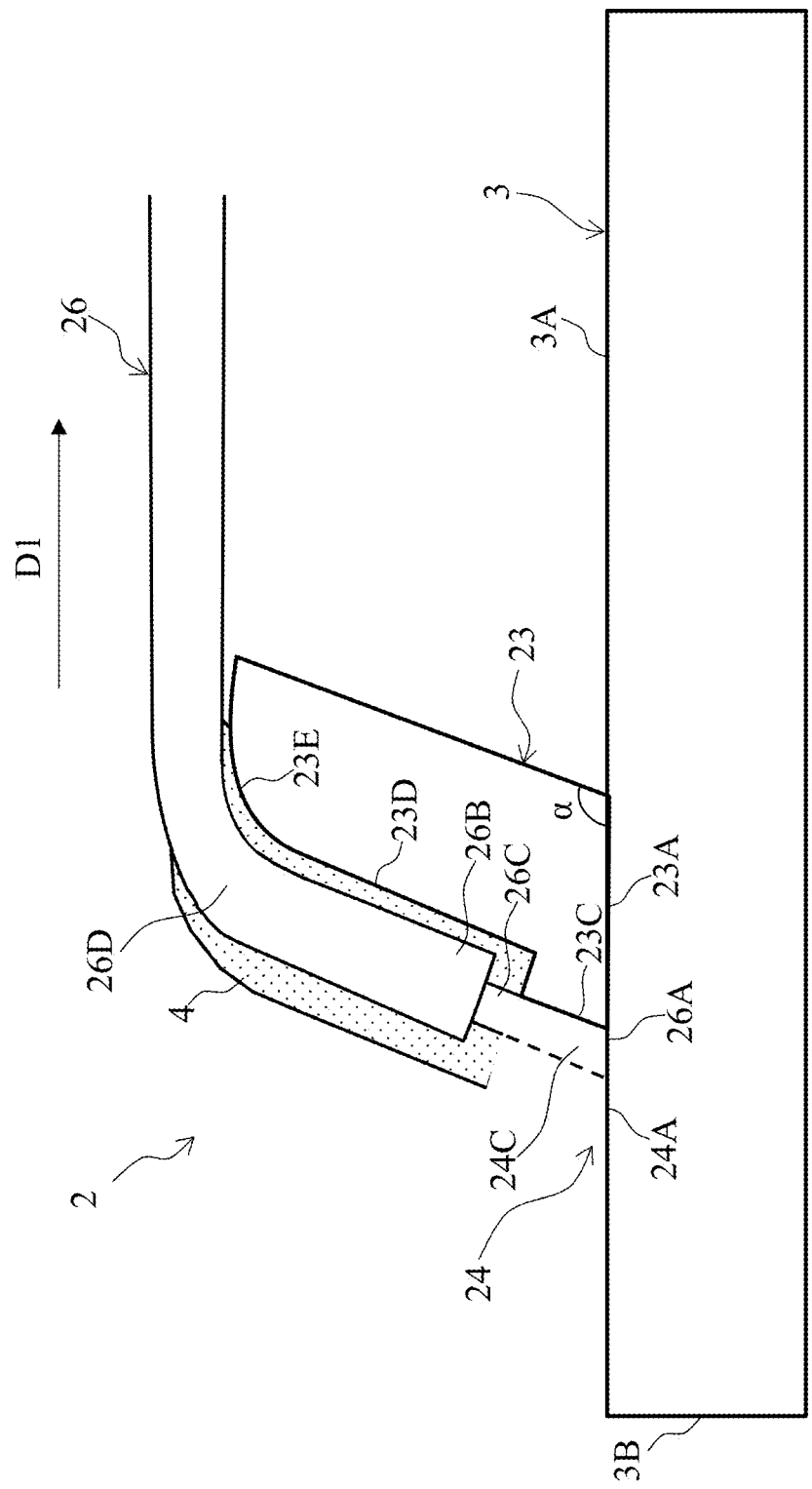
Figures 1, 2, 3, 4, 5, 6, 7, 8:
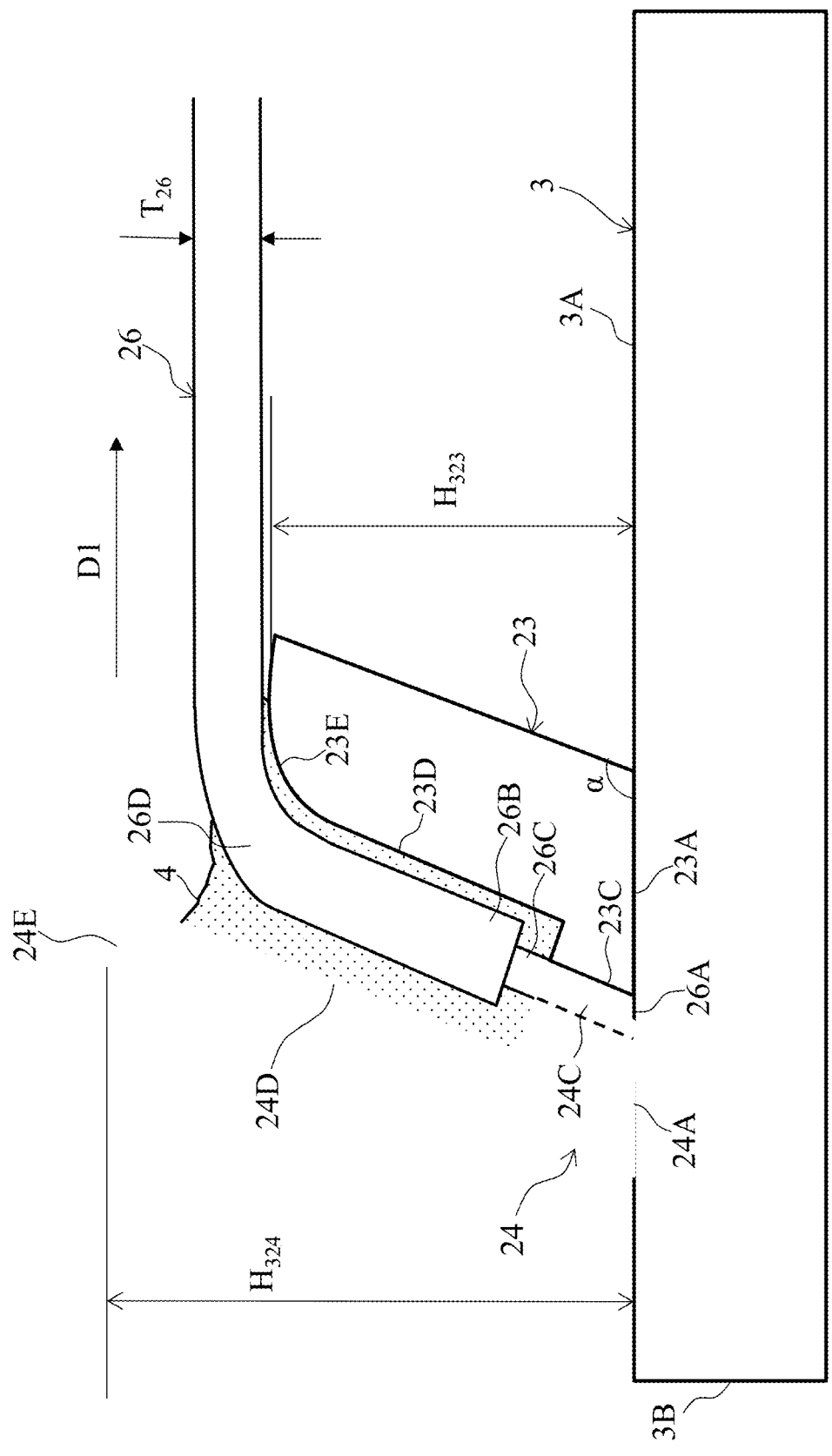
Figure 2:
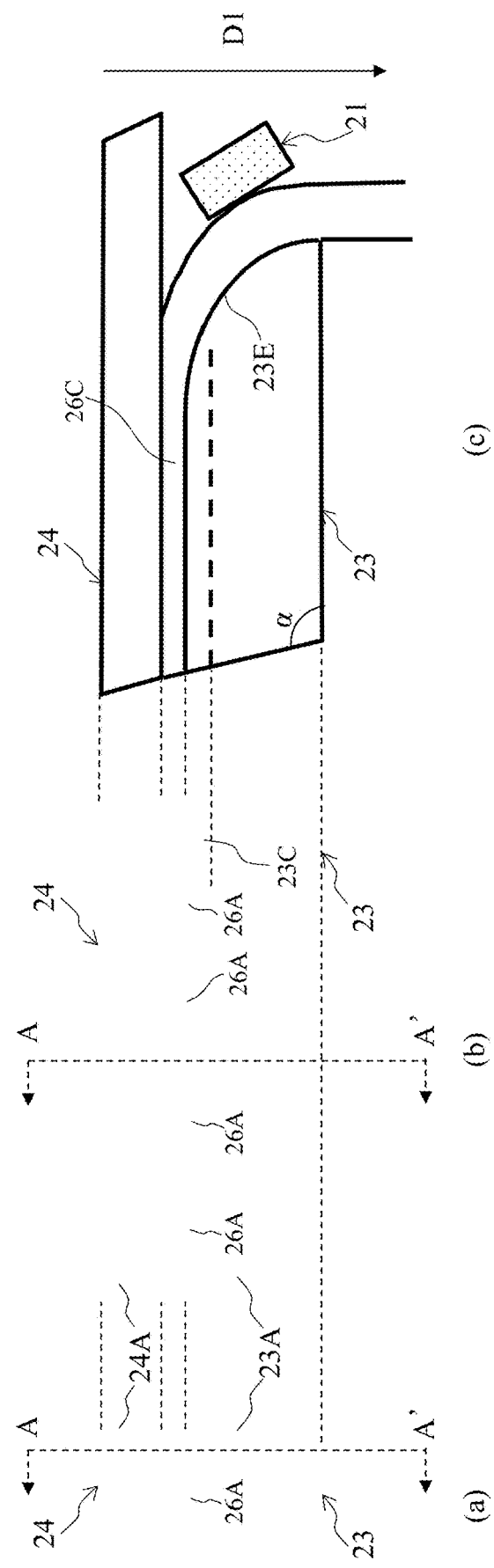
Figures 2, 3:
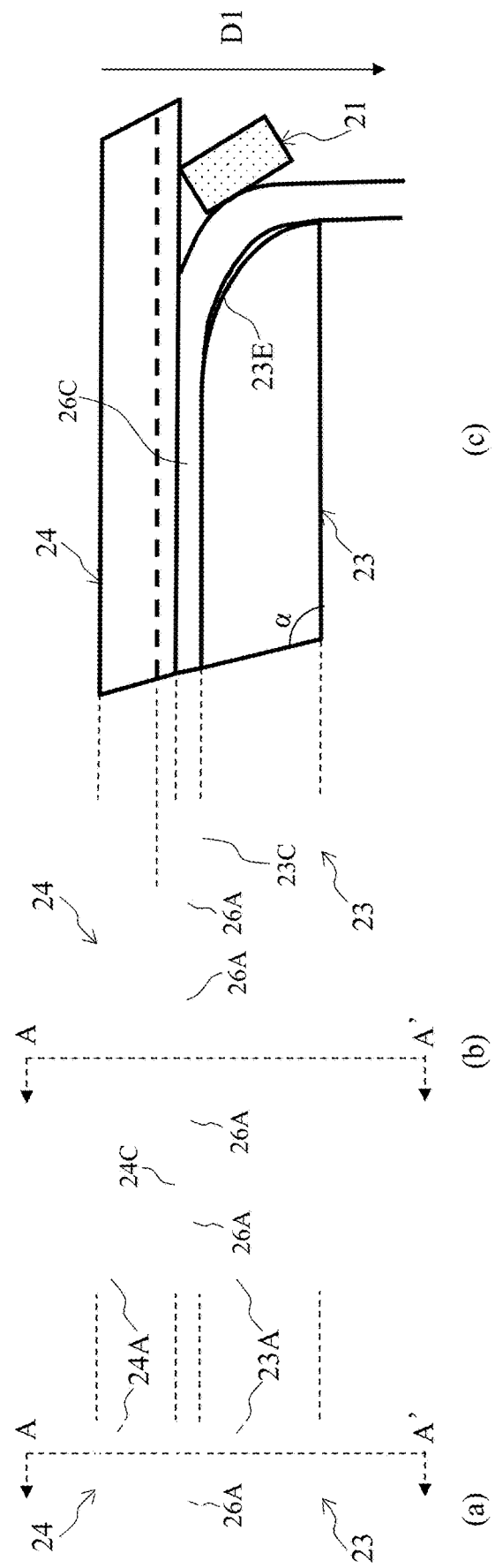
Figures 2, 3, 4:
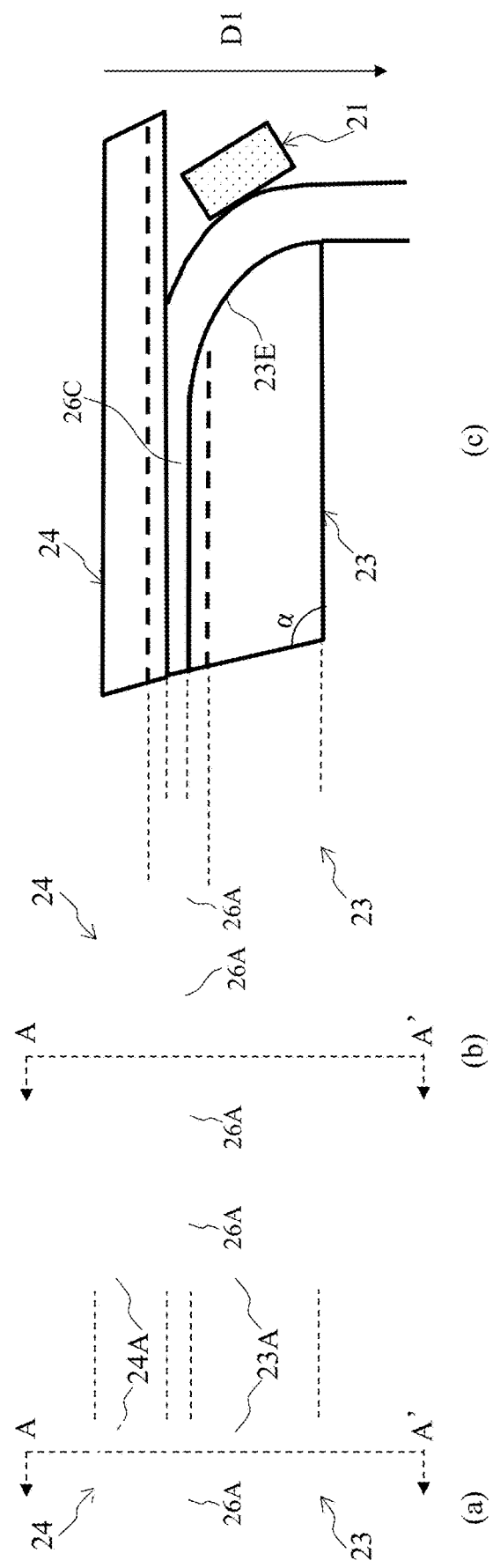
Figures 2, 3, 4, 5, 6:
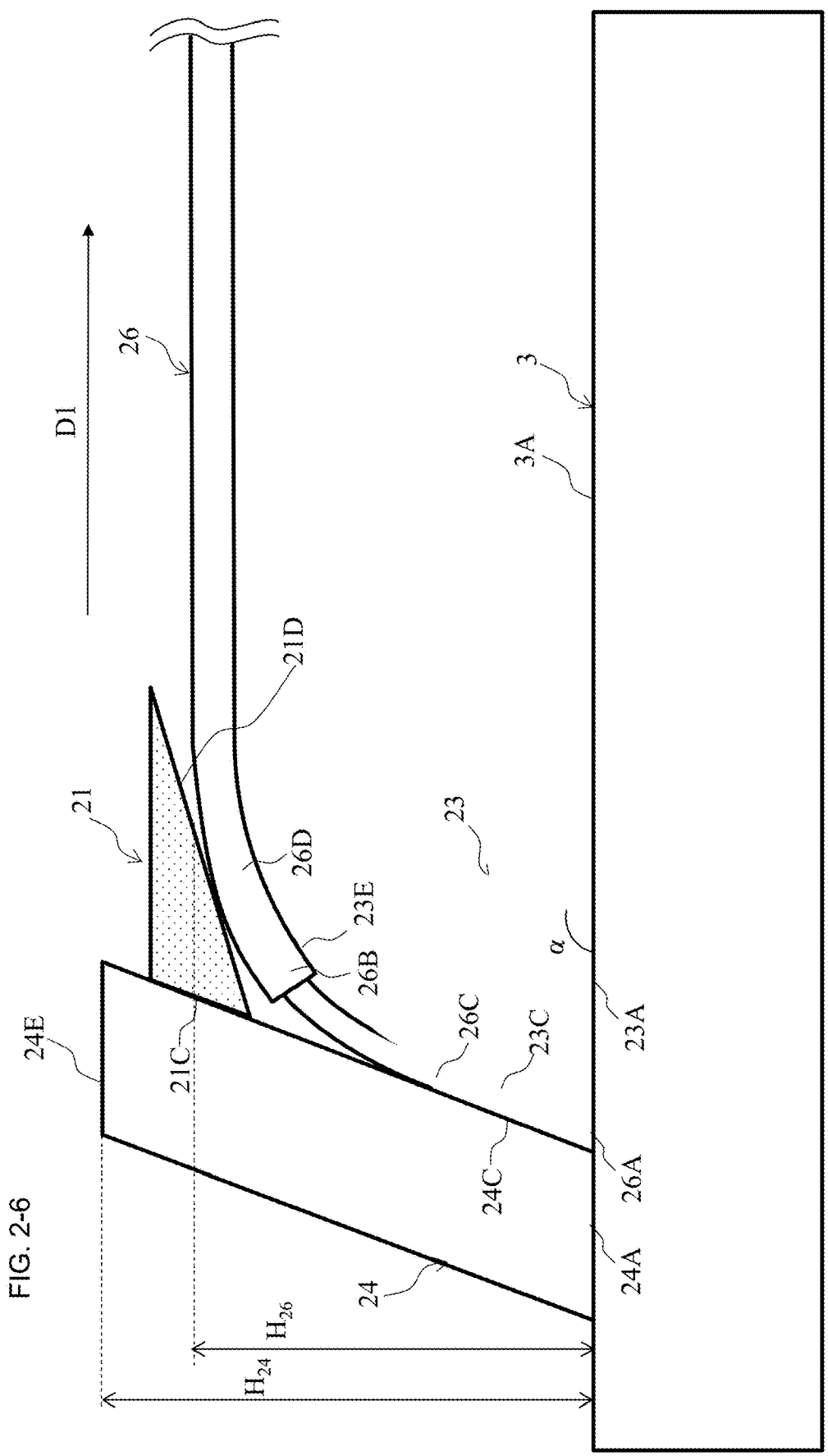
Figures 2, 3, 4, 5, 6, 7, 8:
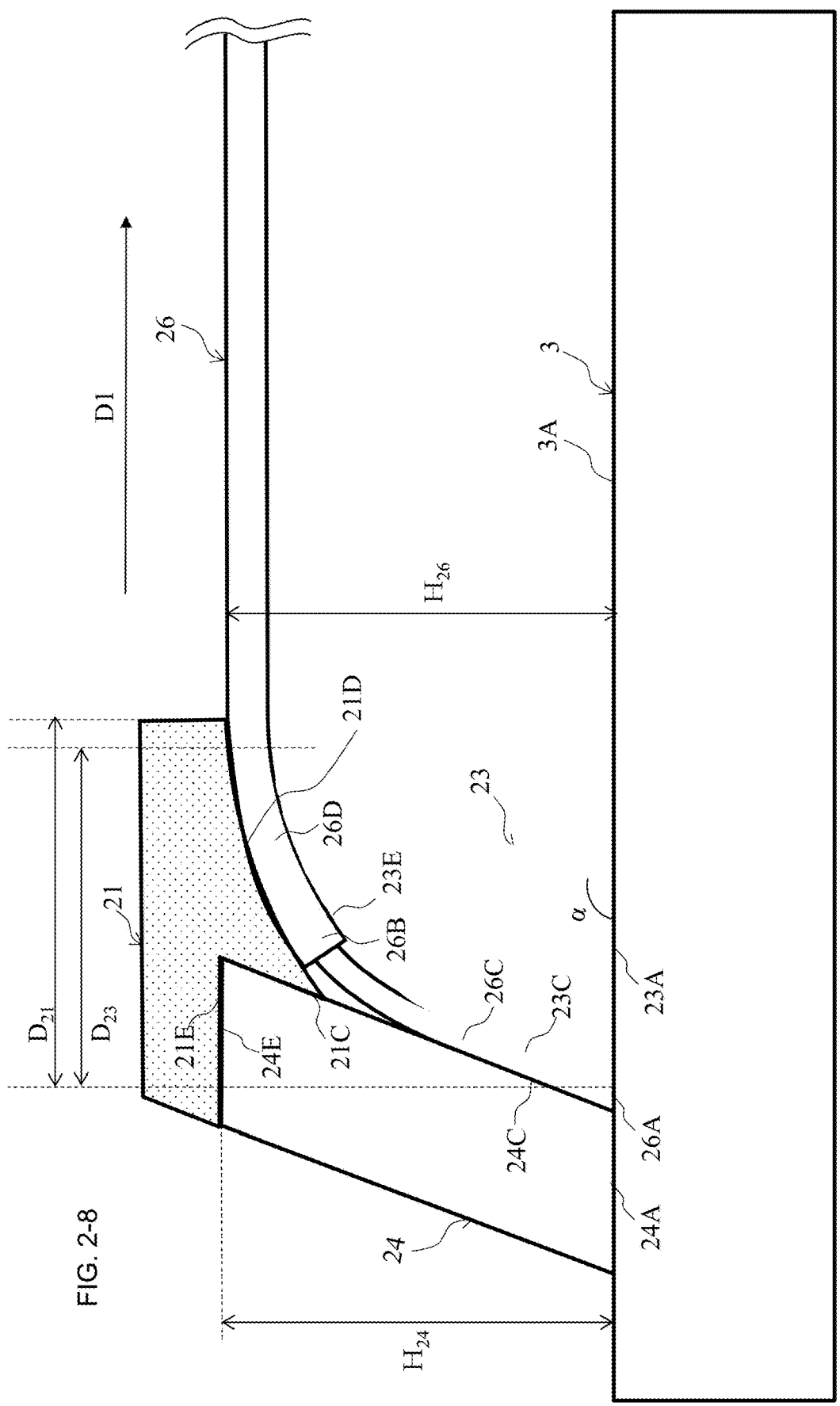
Figures 2, 3, 4, 5, 6, 7, 8, 9, 10, 11:
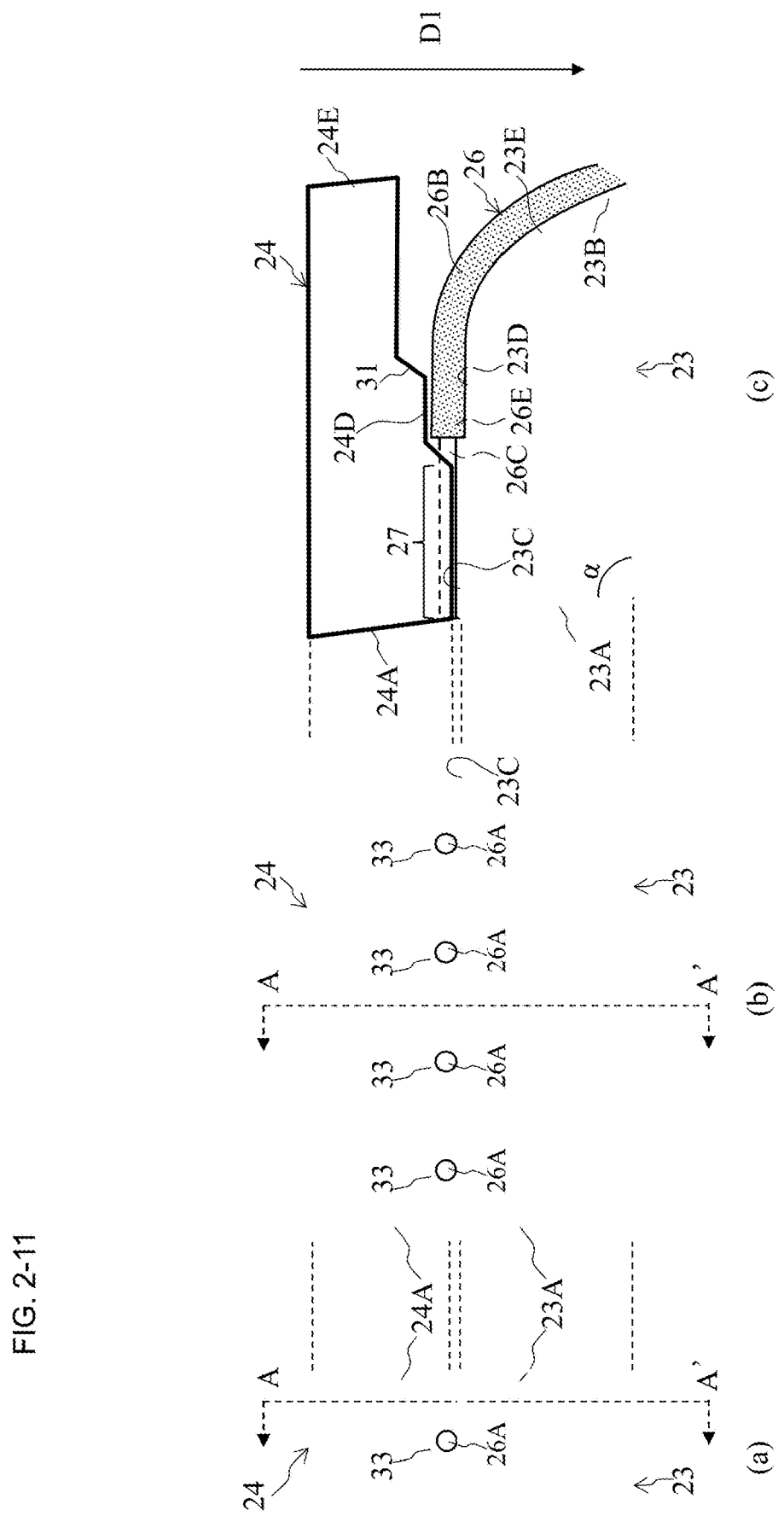

FIG. 2-4 includes side views and a cross-sectional view illustrating an exemplary third configuration of the optical fiber holder according to the first embodiment of the second disclosure.

FIG. 2-5 illustrates an exemplary configuration of the optical fiber holder where a pressing surface is curved according to the first embodiment of the second disclosure.

FIG. 2-6 illustrates an exemplary first configuration of an optical fiber holder of a second embodiment of the second disclosure.

FIG. 2-7 illustrates an exemplary second configuration of the optical fiber holder of the second embodiment of the second disclosure.

FIG. 2-8 illustrates an exemplary third configuration of the optical fiber holder of the second embodiment of the second disclosure.

FIG. 2-9 illustrates an example of connecting an optical fiber holder to an optical circuit according to a third embodiment of the second disclosure.

FIG. 2-10 includes side views and a cross-sectional view illustrating an exemplary first configuration of the optical fiber holder according to the third embodiment of the second disclosure.

FIG. 2-11 includes side views and a cross-sectional view illustrating an exemplary second configuration of the optical fiber holder according to the third embodiment of the second disclosure.

FIG. 2-12 illustrates a first example of connecting an optical fiber holder to an optical circuit according to a fourth embodiment of the second disclosure.

FIG. 2-13 illustrates a second example of connecting the optical fiber holder to the optical circuit according to the fourth embodiment of the second disclosure.

DETAILED DESCRIPTION OF THE PREFERRED EMBODIMENT

The following describes the embodiments of this disclosure in detail with reference to the drawings. This disclosure is not limited to the following embodiments. These embodiments are merely illustrative, and this disclosure can be embodied in a form of various variations and improvements based on knowledge of those skilled in the art. It is to be noted that in the first disclosure and the second disclosure described in the present specification and in the drawings, components having the identical reference numerals mutually denote the identical components in the respective disclosures.

First Embodiment of First Disclosure

FIG. 1-1 illustrates an example of connecting an optical fiber member to an optical circuit according to the embodiment. An optical fiber member 2 according to the embodiment is a member to connect an end surface 26A of an optical fiber 26 to an optical circuit 3. The optical circuit 3 is, for example, a Planar Lightwave Circuit (PLC) equipped with an optical waveguide. The optical fiber member 2 is equipped with the optical fiber 26 and holding members 23 and 24. In this embodiment, the holding member 23 located in an extending direction D1 of the optical fiber 26 functions as a first holding member, and the holding member 24 functions as a second holding member.

The optical fiber 26 is curved at a curving portion 26D and extends. The curving portion 26D is located at a predetermined part protected by a coat 26B of the optical fiber 26. The holding member 23 is located in the extending direction D1 of the optical fiber 26. For example, as illustrated in FIG. 1-1, when the end surface 26A of the optical fiber 26 is connected to a top surface 3A of the optical circuit 3, the extending direction D1 of the optical fiber 26 is a direction along the top surface 3A of the optical circuit 3. When the end surface 26A of the optical fiber 26 is connected to an end surface 3B of the optical circuit, the extending direction D1 of the optical fiber 26 is a direction approximately perpendicular to the top surface 3A of the optical circuit 3.

The end surface 23A located at one end of the holding member 23 is joined to the top surface 3A of the optical circuit 3. The joining is preferably performed using a photocurable resin such as an ultraviolet ray curable resin. The end surface 23A of the holding member 23 and an end surface 24A of the holding member 24 are located on an identical plane, and the end surface 24A of the holding member 24 is joined to the top surface 3A of the optical circuit 3, preferably. Since a joined area with the top surface 3A of the optical circuit 3 increases, a joining strength can be reinforced. The holding member 24 may be performed with an end surface polishing together with the optical fiber 26 and the holding member 23.

An angle α between an optical axis of the optical fiber 26 on the end surface 26A and the end surface 23A of the holding member 23 is preferred not to be 90°, and this ensures preventing attenuation due to reflection by the end surface 26A. The angle α is preferably an angle adjusted to a light incidence/emission direction from the optical circuit 3.

A thermal expansion coefficient of the holding member 24 is, from the point of a temperature characteristic and a long period reliability, preferably equal to a thermal expansion coefficient of the holding member 23. For example, the thermal expansion coefficients of the holding members 23 and 24 are given values in 2 to $300 \times 10^{-7}$° C. A material of the holding member 24 is preferably identical to a material of the holding member 23. For example, both the holding members 23 and 24 are made of borosilicate glass. Thus, since the displacements of the holding members 23 and 24 due to an environmental temperature are equal, peeling of an adhesive 4 due to the environmental temperature can be prevented.

The holding members 23 and 24 are bonded using a photocurable adhesive, preferably. In this case, the adhesive 4 is a photocurable resin, and the holding members 23 and 24 are made of a transparent glass such as a borosilicate glass and a quartz glass.

Furthermore, the thermal expansion coefficients of the holding members 23 and 24 and the optical circuit 3 are mutually equivalent, preferably. For example, for the board of the optical circuit 3, silicon and quartz glass are typically used. Therefore, the thermal expansion coefficients of the holding members 23 and 24 are preferably equivalent to the thermal expansion coefficient of silicon or quartz glass at an assumed environmental temperature. The thermal expansion coefficient of silicon is approximately $30 \times 10^{-7}$/° C., and the thermal expansion coefficient of quartz glass is approximately $5 \times 10^{-7}$° C. For example, as a material close to the thermal expansion coefficient of silicon, the borosilicate glass having the thermal expansion coefficient of $32.5 \times 10^{-7}$/° C. can be exemplified. For the quartz glass, a synthetic quartz glass having the thermal expansion coefficient of $5.1 \times 10^{-7}$/° C. can be exemplified.

The holding member 23 has a curved surface 23E at a position adjacent to the curving portion 26D in the extending direction D1. The curved surface 23E is curved with a predetermined curvature radius along the extending direction D1 of the optical fiber 26. The predetermined curvature radius is a curvature radius configured to prevent the optical fiber 26 from being excessively bent to be broken when the optical fiber 26 is pulled. For example, when an allowable bending radius of the optical fiber 26 is 30 mm, a predetermined bending radius of the curved surface 23E is 30 mm or more. The curving portion 26D of the optical fiber 26 is preferably secured to the curved surface 23E with the adhesive 4.

The holding member 23 has a holding flat portion 23C, and the holding member 24 has a holding flat portion 24C. The holding flat portions 23C and 24C sandwich an end portion 26C where the coat 26B is removed. This ensures securing the end surface 26A of the optical fiber 26 to the end surfaces 23A and 24A of the holding members 23 and 24.

The holding member 23 has an anchor flat portion 23D between the holding flat portion 23C and the curved surface 23E. The holding member 24 has an anchor flat portion 24D. The anchor flat portions 23D and 24D house an end portion of the coat 26B. A bare fiber extending from the holding flat portions 23C and 24C of the end portion 26C of the optical fiber 26 is housed between the anchor flat portions 23D and 24D. This ensures protecting the bare fiber of the end portion 26C of the optical fiber 26.

FIG. 1-2, FIG. 1-3, and FIG. 1-4 illustrate the exemplary holding members 23 and 24. FIG. 1-2 is a perspective view of the holding members 23 and 24, FIG. 1-3 is a trihedral figure of the holding member 24, and FIG. 1-4 is a trihedral figure of the holding member 23. The holding flat portion 24C is provided with aligning grooves 24F to align the optical fibers 26. The holding flat portion 23C holds the optical fibers 26 located on the aligning grooves 24F. Thus, the holding flat portions 23C and 24C secure the end surfaces 26A of the optical fibers 26 to predetermined positions at opened one end of the holding members 23 and 24.

The holding flat portion 23C and the anchor flat portion 23D are parallel planes with a level difference 23G. The holding flat portion 24C and the anchor flat portion 24D are parallel planes with a level difference 24G. The level differences 23G and 24G have heights equivalent to a thickness of the coat 26B. This ensures the holding members 23 and 24 to hold the optical fiber 26 from the end surface 26A to the curving portion 26D without curving the optical fiber 26. Between the anchor flat portions 23D and 24D, as illustrated in FIG. 1-1, the adhesive 4 is filled. Furthermore, the curved surface 23E and the curving portion 26D are secured with the adhesive 4, preferably.

At least one of the anchor flat portions 23D and 24D is provided with an adhesive reservoir, preferably. For example, as illustrated in FIG. 1-5, grooves 23H and 23I are disposed on the anchor flat portion 23D. The groove 23H is located between the holding flat portion 23C and the anchor flat portion 23D. The groove 23I is located between the anchor flat portion 23D and the curving portion 26D. Note that any shape of the adhesive reservoir is employed.

The shape of the holding member 23 can be formed by polishing a glass plate having a thickness $T_{23}$. Similarly to the holding member 23, the shape of the holding member 24 can be formed by polishing a glass plate having a thickness $T_{24}$.

As described above, since the holding member 23 has the curved surface 23E, the disconnection of the optical fiber 26 can be prevented even when the optical fiber 26 is connected to the optical circuit 3 in the curved state. Because of the configuration by the two holding members 23 and 24 the optical fiber 26, the number of components is considerably small. Therefore, the optical fiber member 2 is easily mounted to the optical circuit 3. Accordingly, in the optical fiber member 2 of the first disclosure, the disconnection of the optical fiber 26 can be prevented and the optical fiber 26 can be easily mounted to the optical circuit 3 even when the optical fiber 26 is connected to the optical circuit 3 in the curved state.

While the example where the holding member 24 is provided with the aligning groove 24F is described in this embodiment, the first disclosure is not limited to this. For example, as illustrated in FIG. 1-6, the holding flat portion 23C of the holding member 23 may be provided with an aligning groove 23F to secure the end portion 26C of the optical fiber 26. In this case, the second holding member 24 does not need to be provided with the aligning groove 24F.

While it is described that the optical fiber member 2 according to the embodiment holds a plurality of the optical fibers 26, the first disclosure is not limited to this. For example, a holder member 23 or 24 may be provided with the single aligning groove 23F or 24F so as to hold the single optical fiber 26. The optical fibers 26 arranged in the holding member 23 are not limited to be arranged in one row, but may be arranged in two rows or more.

As illustrated in FIG. 1-7, the holding member 24 does not need to be provided with the anchor flat portion 24D. In this case, instead of the anchor flat portion 24D, the coat 26B of the optical fiber 26 is secured with the adhesive 4.

Second Embodiment of First Disclosure

FIG. 1-8 illustrates an example of connecting the optical fiber member to the optical circuit according to this embodiment. In this embodiment, at least a part of the anchor flat portion 24D is separated from the optical circuit 3 compared with the optical fiber 26 arranged on the curved surface 23E of the holding member 23. More specifically, $H_{324}$ is defined as a height of the holding member 24 from the top surface 3A of the optical circuit 3, $H_{323}$ is defined as a height of the holding member 23 from the top surface 3A of the optical circuit 3, and $T_{26}$ is defined as a thickness of the optical fiber 26. In this case, in this embodiment, $H_{324} > (H_{323} + T_{26})$ is satisfied.

Employing the configuration of FIG. 1-8 can cause the second holding member 24 to have a protection function for the optical fiber 26. For example, the optical fiber 26 can be protected against a falling object from the top or a contact.

First Embodiment of Second Disclosure

FIG. 2-1 illustrates an exemplary optical fiber holder according to this embodiment. The optical fiber holder according to this embodiment is equipped with two holding members 23 and 24 sandwiching an optical fiber 26 and a spacer 21. The holding member 23 is located in an extending direction D1 of the optical fiber 26, and functions as a first holding member. The holding member 24 functions as a second holding member.

In the second disclosure, an end surface 26A of the optical fiber 26 is disposed while being sandwiched between an end surface 23A as one end of the holding member 23 and an end surface 24A as one end of the holding member 24, and the optical fiber 26 is curved to extend on an end surface 23B as the other end of the holding member 23. For example, as FIG. 2-1, when the end surface 26A of the optical fiber 26 is connected to a top surface 3A of an optical circuit 3, the direction D1 of the optical fiber 26 is a direction along the top surface 3A of the optical circuit 3. Here, while a direction in a parallel direction to the top surface 3A can be exemplified as the direction D1 as one example, the second disclosure is not limited to this, but the direction D1 may be any direction excluding the direction perpendicular to the top surface 3A. The optical circuit 3 is, for example, a photonic optical circuit (hereinafter referred to as the optical circuit) equipped with an optical waveguide and an optical coupler.

The end surface 23A of the holding member 23 is joined to the top surface 3A of the optical circuit 3. The joining is preferably performed using a photocurable resin such as an ultraviolet ray curable resin. The end surface 23A of the holding member 23 and the end surface 24A as the one end of the holding member 24 are located on an identical plane, and joined to the top surface 3A of the optical circuit 3, preferably. Since a joined area with the top surface 3A of the optical circuit 3 increases, a joining strength can be reinforced. The holding member 24 may be performed with an end surface polishing together with the optical fiber 26 and the holding member 23 to which the optical fiber 26 is secured.

An angle α between an optical axis of the optical fiber 26 on the end surface 26A and the end surface 23A of the holding member 23 is preferred not to be 90°, and this ensures preventing attenuation due to reflection by the end surface 26A. The angle α is preferably an angle adjusted to a light incidence/emission angle from the optical circuit 3.

The holding members 23 and 24 are holding members using V grooves, and at least any of the holding members 23 and 24 is provided with the V groove. For example, the V grooves may be formed only on the holding member 23 as illustrated in FIG. 2-2, the V grooves may be formed only on the holding member 24 as illustrated in FIG. 2-3, or the V grooves may be formed on both the holding members 23 and 24 as illustrated in FIG. 2-4. The part of the optical fiber 26 sandwiched between the V grooves of the holding members 23 and 24 is an element wire 26C where a coat 26B is removed. When the V grooves are formed on the holding member 23, the V grooves may be formed only on the part to hold the element wire 26C, while the V grooves may be formed also on a curving portion 23E.

The number of the optical fibers sandwiched by the holding members 23 and 24 may be configured to be any number. For example, the number of the optical fibers may be one as illustrated in FIG. 2-2 (*a*), FIG. 2-3 (*a*), and FIG. 2-4 (*a*), or may be four as illustrated in FIG. 2-2 (*b*), FIG. 2-3 (*b*), and FIG. 2-4 (*b*). When the number of the optical fibers sandwiched by the holding members 23 and 24 is a plural number, the optical fiber holder of the second disclosure can constitute a fiber array.

The holding member 23 has the curving portion 23E curved with a predetermined curvature radius along the direction D1 of the optical fiber 26. The predetermined curvature radius is a value configured to prevent the optical fiber 26 from being excessively bent to be broken, and a value configured to extract the optical fiber 26 in the direction along the top surface 3A of the optical circuit 3. The optical fiber 26 is preferably secured to the curving portion 23E by an adhesive.

The spacer 21 has a function to press the optical fiber 26 onto the curving portion 23E such that the optical fiber 26 is curved along the curving portion 23E. This ensures extending the optical fiber 26 in the direction D1 in the state where the end surface 26A of the optical fiber 26 is secured to the optical circuit 3.

The spacer 21 is a structure in a pillar shape or a pipe shape, and the cross-sectional shape of the pillar shape or the pipe shape is any shape. For example, a square-shaped cross section or a circular cross section as illustrated in FIG. 2-1 to FIG. 2-4 may be employed. At least a part of a pressing surface 21D in contact with the optical fiber 26 is preferred to be located along the curving portion 23E, and for example, as illustrated in FIG. 2-5, preferred to be curved corresponding to the curvature radius of the curving portion 23E.

While materials of the holding members 23 and 24 and the spacer 21 are appropriately employed, for example, metal can be used in addition to glass and resin. When the holding members 23 and 24 and the spacer 21 are metal, a thermo-setting resin can be used to secure the optical fiber 26 between the holding member 23 and the spacer 21. When the holding members 23 and 24 and the spacer 21 are glass transparent to UV or resin, a UV curable resin can be used to secure the optical fiber 26 between the holding member 23 and the spacer 21. Thus, since the holding members 23 and 24 and the spacer 21 transmit UV, the securing with the UV curable resin is ensured to facilitate the manufacturing.

As described above, in this embodiment, using the spacer 21 to press the optical fiber 26 onto the curving portion 23E ensures the control on the bending of the optical fiber at the curvature radius of the curving portion 23E. Here, in this embodiment, the holding member 23 has the curving portion 23E, and the spacer 21 is disposed in a void between the holding member 23 and the holding member 24 provided due to the curving portion 23E. Therefore, in this embodiment, the bending radius of the optical fiber 26 can be controlled without increasing the sizes of the holding members 23 and 24 and the spacer 21 as the components that secure the optical fiber 26.

Second Embodiment of Second Disclosure

FIG. 2-6 illustrates an exemplary optical fiber holder according to this embodiment. The spacer 21 is pushed up in a direction where the optical fiber 26 separates from the holding member 23 due to a load by a bending stress of the optical fiber 26, thus the spacer 21 is possibly peeled off. Therefore, in the optical fiber holder according to this embodiment, the spacer 21 is secured to the holding member 24 on a planar surface 21C and a side surface 24C to prevent the spacer 21 from being pushed up.

In this embodiment, a height H24 from the top surface 3A of the optical circuit 3 to an end surface 24E is preferred to be higher than a height H26 from the top surface 3A of the optical circuit 3 to the optical fiber 26 such that the spacer 21 can be joined to the holding member 24 with the adhesive. While the example where the cross-sectional shape of the spacer 21 is a wedge shape is illustrated in FIG. 2-6, similarly to the first embodiment, the cross-sectional shape of the spacer 21 may be any shape also in this embodiment.

The securing of the spacer 21 to the holding member 24 is preferred to be strong, and the holding member 24 and the spacer 21 are preferred to be in surface contact. Therefore, in this embodiment, the planar surface 21C to be in contact with the holding member 24 is provided on the spacer 21, and the side surface 24C of the holding member 24 on the holding member 23 side is formed as a flat surface. Thus, joining the planar surfaces one another ensures increase in contacted area of the holding members 23 and 24 and the spacer 21. Accordingly, this embodiment can prevent the spacer 21 from being peeled off due to bending stress load of the optical fiber 26.

Here, also in this embodiment, the pressing surface 21D of the spacer 21 is preferred to be curved corresponding to the curvature radius of the curving portion 23E as illustrated in FIG. 2-7.

Furthermore, as illustrated in FIG. 2-8, a surface 21E of the spacer 21 is preferred to be secured to the end surface 24E of the holding member 24. Therefore, since a joining area of the holding member 24 and the spacer 21 increases, the optical fiber 26 can be more efficiently pressed onto the curving portion 23E. Additionally, in the manufacturing, position fixing of the holding members 23 and 24 and the spacer 21 can be facilitated. Furthermore, the holding member 24 and the spacer 21 may be integrally formed.

The spacer 21 is preferred to have a sufficient length to the extent that the optical fiber 26 extends in the direction D1. For example, as illustrated in FIG. 2-7 and FIG. 2-8, the length of the spacer 21 may be determined by comparing a distance D21 with a distance D23 having the end surface 26A of the optical fiber 26 as a reference. Here, the distance D21 is a distance from a position of the holding member 23 on the end surface 26A of the optical fiber 26 to the end portion of the spacer 21 in the direction D1 on the direction D1. The distance D23 is a distance from a position of the holding member 23 on the end surface 26A of the optical fiber 26 to the end portion of the holding member 23 in the direction D1 on the direction D1. For example, a length where the pressing surface 21D provided on the spacer 21 is in contact with the optical fiber 26 is longer than a length where the curving portion 23E provided on the holding member 23 is in contact with the optical fiber 26.

As illustrated in FIG. 2-8, when the end surface 24E of the holding member 24 is joined with the spacer 21 on both planar surfaces, the height H24 from the top surface 3A of the optical circuit 3 to the end surface 24E can be approximately identical to the height H26 from the top surface 3A of the optical circuit 3 to the optical fiber 26 regardless of the description of the second embodiment, and may be lower than the height H26 from the top surface 3A of the optical circuit 3 to the optical fiber 26.

Third Embodiment of Second Disclosure

FIG. 2-9 illustrates an exemplary optical fiber holder according to this embodiment. The optical fiber holder according to this embodiment is equipped with the two holding members 23 and 24 to sandwich the optical fiber 26. The optical fiber holder according to this embodiment uses the holding members 23 and 24 to connect the end surface 26A of the optical fiber 26 to the top surface 3A of the optical circuit 3. The holding member 23 is located in the extending direction D1 of the optical fiber 26, and functions as the first holding member. The holding member 24 functions as the second holding member. Another end 23B of the holding member 23 has the curving portion 23E curved with the predetermined curvature radius along the direction D1.

The optical fiber 26 and the holding members 23 and 24 are secured with the adhesive. When the adhesive flows into the curving portion 23E in this securing, breakage possibly occurs on the optical fiber 26 due to, for example, change in shape of the curving portion 23E or adhesion of the adhesive on the optical fiber 26 to be curved at the curving portion 23E. Therefore, to prevent the adhesive from entering into the curving portion 23E, the holding member 24 is provided with a depressed portion 31 into which the adhesive used for fixedly securing the optical fiber 26 is to be flown. While the example where the depressed portion 31 is provided only on the holding member 24 is described as one example in this embodiment, the second disclosure is not limited to this, but similar effects can be obtained even if the depressed portion 31 is provided on the holding member 23, or the depressed portion 31 may be provided on both the holding members 23 and 24.

FIG. 2-10 and FIG. 2-11 illustrate a first example and a second example of a detailed structure of the optical fiber holder according to the embodiment. The holding member 23 has a planar surface 23C that functions as a third planar surface, and the holding member 24 is provided with grooves 33 to hold the element wires 26C of the optical fibers 26. The element wire 26C of the optical fiber 26 is sandwiched between the planar surface 23C and the groove 33. The part where the element wire 26C of the optical fiber 26 is sandwiched is defined as optical fiber holding portions 27.

While the example where the groove 33 is provided on the holding member 24 is indicated in this embodiment, similarly to the first and the second embodiments, the groove 33 only needs to be formed on at least any of the holding members 23 and 24. That is, for the configuration of the optical fiber holding portion 27, any configuration of FIG. 2-2, FIG. 2-3, and FIG. 2-4 indicated in the first embodiment may be employed.

The holding member 23 has a planar surface 23D that functions as a first planar surface, and the holding member 24 has a planar surface 24D that functions as a second planar surface. The planar surface 23D is a planar surface connected to the curved surface 23E. The planar surface 24D is a planar surface that faces the planar surface 23D across the optical fiber 26. Thus, the planar surface 23D and the planar surface 24D are located on the end surface 24E side of the optical fiber holding portions 27.

The depressed portion 31 is provided on at least any one of the planar surface 23D or 24D. This prevents the adhesive from flowing into the curving portion 23E. To keep the element wire 26C of the optical fiber 26 and an end portion 26E of the coat 26B of the optical fiber in a straight line, the planar surface 23D and the planar surface 23C are preferred to be parallel, and furthermore, the planar surface 23D and the planar surface 24D are preferred to be parallel.

The depressed portion 31 may employ any shape where the adhesive used for holding the optical fiber 26 can flow into the depressed portion 31. For example, the groove shape as illustrated in FIG. 2-9 and FIG. 2-10 (c) is employable. A width W31 of the depressed portion 31 is any width, and as illustrated in FIG. 2-11 (c), the depressed portion 31 may be configured in a stepped shape reaching the end surface 24E of the holding member 24.

In the second disclosure, the optical fiber 26 is curved at the curving portion 23E. At this time, when the element wire 26C of the optical fiber 26 is curved at the curving portion 23E, the element wire 26C of the optical fiber 26 possibly cannot bear the bending stress to be broken. Therefore, to prevent the bending stress at the curving portion 23E from being applied to the element wire 26C of the optical fiber 26, the end portion 26E of the coat 26B of the optical fiber 26 is preferred to be sandwiched by the planar surface 23D and the planar surface 24D.

The element wire 26C part of the optical fiber 26 tends to be easily broken. Therefore, the end portion 26E of the coat 26B of the optical fiber 26 is preferred to be secured to the planar surface 23D and the planar surface 24D with the adhesive. Accordingly, the depressed portion 31 is preferred to be located on the end surface 24E side of the holding member 24 with respect to the end portion 26E of the coat 26B of the optical fiber 26, that is, the depressed portion 31 is preferred to be disposed on the part where the coat of the optical fiber is located. Thus, since the whole of the element wire 26C of the optical fiber 26 is secured with the adhesive, and furthermore, the optical fiber 26 is secured up to the coat 26B with the adhesive, the element wire 26C of the optical fiber 26 can be prevented from being broken.

The optical fiber holding portions 27 sandwich the element wire 26C of the optical fiber 26, and the planar surfaces 23D and 24D sandwich the coat 26B of the optical fiber 26. Therefore, level differences corresponding to the thickness of the coat 26B of the optical fiber 26 are preferred to be provided between the optical fiber holding portions 27 and the planar surface 23D. For example, the planar surface 23C and the planar surface 23D are parallel, and a distance between these surfaces is approximately equal to the thickness of the coat 26B of the optical fiber 26. Thus, the optical fiber holding portions 27 can sandwich the end portion 26E of the coat 26B of the optical fiber 26 without applying the bending stress to the element wire 26C of the optical fiber 26. Such a level difference corresponding to the thickness of the coat 26B of the optical fiber 26 may be provided on not only the holding member 23 but also the holding member 24, or may be provided on both the holding members 23 and 24.

As described above, since the optical fiber holder according to this embodiment is provided with the curving portion 23E, the bending radius can be controlled without increasing the sizes of the components that secure the optical fiber 26. Since the optical fiber holder according to this embodiment is provided with the depressed portion 31, the flowing of the adhesive into the curving portion 23E can be prevented. In the optical fiber holder according to this embodiment, since the optical fiber holding portions 27 sandwich the element wire 26C of the optical fiber 26 and the end portion 26E of the coat 26B of the optical fiber 26 is located to a proximity of the optical fiber holding portions 27, the bending stress to the element wire 26C of the optical fiber 26 can be prevented.

Fourth Embodiment of Second Disclosure

An optical fiber holder according to this embodiment is further equipped with the spacer 21 described in the first and the second embodiments further in addition to the optical fiber holder described in the third embodiment. FIG. 2-12 illustrates an application example of the optical fiber holder illustrated in FIG. 2-10 to the third embodiment, and FIG. 2-13 illustrates an application example of the optical fiber holder illustrated in FIG. 2-11 to the third embodiment.

In this embodiment, the end portion 26E of the coat 26B of the optical fiber 26 is sandwiched by the planar surface 23D and the planar surface 24D, and the depressed portion 31 is provided on the planar surface 24D.

The holding members 23 and 24 and the spacer 21 are secured with the adhesive while sandwiching the optical fiber 26. In the second disclosure, since the depressed portion 31 is provided, the flowing of the adhesive of the optical fiber holding portions 27 into the curving portion 23E can be prevented, and this ensures performing the adhesion of the spacer 21 in the state where the optical fiber 26 is located on the appropriate position.

When the depressed portion 31 has the stepped shape as illustrated in FIG. 2-11, a dimension $H_{31}$ from the end portion of the depressed portion 31 on the end surface 24A side to the end surface 24E illustrated in FIG. 2-13 may be identical to a dimension $H_{21}$ of a projecting portion of the spacer 21, but a configuration having a dimension greater than $H_{21}$ is employable. This ensures providing a void to cause the adhesive to flow in between the end portion of the depressed portion 31 on the end surface 24A side and the spacer 21.

INDUSTRIAL APPLICABILITY

This disclosure is applicable to information and communication industry.

DESCRIPTION OF REFERENCE SIGNS

Description of Reference Signs of First Disclosure

2 Optical fiber member
23, 24 Holding member 23A, 24A End surface
23C, 24C Holding flat portion
23D, 24D Anchor flat portion
23E Curved surface
23F, 24F Aligning groove
23G, 24G Level difference
23H, 23I Groove
26 Optical fiber
26A End surface
26B Coat
26C End portion
26D Curving portion
3 Optical circuit
3A Top surface
3B End surface
4 Adhesive Description of Reference Signs of Second Disclosure 21 Spacer
23, 24 Holding member
26 Optical fiber
3 Optical circuit
27 Optical fiber holding portion
31 Depressed portion
33 Groove

What is claimed is:

1. An optical fiber member comprising:
two holding members that hold an optical fiber such that an end surface of the optical fiber is located on one end and a predetermined part having a coat of the optical fiber is curved to be extended at another end, wherein
the two holding members include holding flat portions that sandwich an end portion of the optical fiber where the coat is removed such that the end surface of the optical fiber is located on the one end of the optical fiber member,
at least any of the holding flat portions included in the two holding members has an aligning groove to fix a position of the end portion of the optical fiber, and
a first holding member among the two holding members positioned in an extending direction of the optical fiber has a curved surface at a position adjacent to the predetermined part in the extending direction, the curved surface being curved with a predetermined curvature radius along the extending direction of the optical fiber,
wherein the optical fiber is secured to the curved surface with an adhesive,
wherein the two holding members further include anchor flat portions that are flat surfaces parallel to the holding flat portions, and the anchor flat portions have level differences corresponding to a thickness of the coat of the optical fiber, and
wherein an end portion of the coat of the optical fiber is housed between the anchor flat portions of the two holding members.

2. The optical fiber member according to claim 1, wherein the end surface of the optical fiber is located on one ends of the holding flat portions of the two holding members, and wherein the one ends of the holding flat portions of the two holding members are joined to an optical circuit.

3. The optical fiber member according to claim 1, wherein at least a part of the anchor flat portion included in a second holding member different from the first holding member among the two holding members is located separated from the optical circuit compared with the optical fiber located on the curved surface of the first holding member.

4. The optical fiber member according to claim 1, wherein the two holding members are made of an identical material or equal in thermal expansion coefficient.

5. An optical fiber holder comprising:
a first holding member where an end portion of an optical fiber is located on one end and the optical fiber is located to be extended on another end; and
a second holding member that sandwiches the optical fiber with the first holding member, wherein
the first holding member and the second holding member include optical fiber holding portions to sandwich an element wire of the optical fiber on the one ends,
the other end of the first holding member includes a curving portion curved with a predetermined curvature radius along an extending direction of the optical fiber, and
a depressed portion is provided on at least any one of a first planar surface connected to the curving portion and included in the first holding member or a second planar surface facing the first planar surface across the optical fiber and included in the second holding member,
wherein the optical fiber is secured to the curving portion with an adhesive,
wherein the first holding member and the second holding member further include anchor flat portions that are flat surfaces parallel to the optical fiber holding portions, and the anchor flat portions have level differences corresponding to a thickness of a coat of the optical fiber, and
wherein an end portion of the coat of the optical fiber is housed between the anchor flat portions of the first holding member and the second holding member.

6. The optical fiber holder according to claim 5, wherein the depressed portion is disposed on a part where a coat of the optical fiber is located.

7. The optical fiber holder according to claim 5, wherein the optical fiber holding portions sandwich the element wire of the optical fiber using a third planar surface included in the first holding member and a groove included in the second holding member.

8. The optical fiber holder according to claim 7, wherein the third planar surface is approximately parallel to the first planar surface.

9. The optical fiber holder according to claim 5, wherein the second planar surface is approximately parallel to the first planar surface.

10. The optical fiber holder according to claim 5, further comprising a spacer that secures the optical fiber to the other end of the first holding member, wherein the optical fiber is secured between the curving portion and the spacer.

* * * * *